United States Patent
Perras et al.

(10) Patent No.: US 11,646,864 B2
(45) Date of Patent: *May 9, 2023

(54) SYSTEMS AND METHODS FOR PRECISE TIME SYNCHRONIZATION WITH OPTICAL MODULES

(71) Applicant: Ciena Corporation, Hanover, MD (US)

(72) Inventors: Daniel Claude Perras, Ottawa (CA); Sebastien Gareau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 333 days.

This patent is subject to a terminal disclaimer.

(21) Appl. No.: 16/955,272

(22) PCT Filed: Jan. 18, 2019

(86) PCT No.: PCT/US2019/014147
§ 371 (c)(1),
(2) Date: Jun. 18, 2020

(87) PCT Pub. No.: WO2019/147483
PCT Pub. Date: Aug. 1, 2019

(65) Prior Publication Data
US 2020/0396050 A1 Dec. 17, 2020

Related U.S. Application Data

(63) Continuation of application No. 15/878,703, filed on Jan. 24, 2018, now Pat. No. 10,313,103.

(51) Int. Cl.
*H04B 10/40* (2013.01)
*H04B 10/61* (2013.01)
(Continued)

(52) U.S. Cl.
CPC ........... *H04L 7/0075* (2013.01); *H04B 10/40* (2013.01); *H04J 3/0638* (2013.01); *H04J 3/0697* (2013.01); *H04J 3/0667* (2013.01)

(58) Field of Classification Search
CPC .............................. H04B 10/40; H04B 10/616
See application file for complete search history.

(56) References Cited

U.S. PATENT DOCUMENTS 8,718,482 B1 5/2014 Roberts et al.
9,276,689 B2 3/2016 Geva et al.
(Continued)

FOREIGN PATENT DOCUMENTS

WO 2017/012486 A1 1/2017

OTHER PUBLICATIONS

"DP83630 Precision Phyter™—IEEE 1588 Precision Time Protocol Transceiver", Texas Instruments, Apr. 2013 (Year: 2013).*
ITU-T G.709/Y.1331, "Interface for Optical Transport Network", Jun. 2016 (Year: 2016).*
Garner, IEEE 1588 Version 2, ISPCS, Ann Arbor'08, Sep. 24, 2008, pp. 1-89.
(Continued)

*Primary Examiner* — Shi K Li
(74) *Attorney, Agent, or Firm* — Baratta Law PLLC; Lawrence A. Baratta, Jr.

(57) ABSTRACT

An optical module for use in an optical system is disclosed, the optical module implementing Precision Time Protocol (PTP) clock functionality therein. The optical module includes an electrical interface with the optical system; circuitry connected to the electrical interface and configured to implement a plurality of functions of functionality; an optical interface connected to the circuitry; and timing circuitry connected to the electrical interface and one or more of the plurality of functions, wherein the timing circuitry is configured to implement the PTP clock functionality.

16 Claims, 14 Drawing Sheets

(51) Int. Cl.
*H04L 7/00* (2006.01)
*H04J 3/06* (2006.01)

(56) References Cited

U.S. PATENT DOCUMENTS

| | | | |
|---|---|---|---|
| 9,432,144 B2 | 8/2016 | Gareau et al. | |
| 10,313,103 B1* | 6/2019 | Perras | H04J 3/0697 |
| 2012/0027414 A1* | 2/2012 | Wei | H04J 3/0655 |
| | | | 398/100 |
| 2012/0275501 A1 | 11/2012 | Rotenstein | |
| 2013/0209096 A1* | 8/2013 | Le Pallec | H04J 3/0635 |
| | | | 398/35 |
| 2014/0169792 A1 | 6/2014 | Lee et al. | |
| 2014/0355986 A1 | 12/2014 | Trojer et al. | |
| 2015/0104167 A1 | 4/2015 | Bottari et al. | |
| 2015/0207714 A1 | 7/2015 | Ruffini et al. | |
| 2015/0304066 A1 | 10/2015 | Dutti et al. | |
| 2016/0080110 A1 | 3/2016 | Gareau et al. | |
| 2016/0380698 A1 | 12/2016 | Elahmadi et al. | |
| 2017/0005949 A1 | 1/2017 | Gareau | |
| 2017/0093757 A1 | 3/2017 | Gareau et al. | |
| 2017/0126589 A1 | 5/2017 | Estabrooks et al. | |
| 2017/0317759 A1* | 11/2017 | Agazzi | H04L 7/0075 |
| 2018/0006931 A1 | 1/2018 | Ellis et al. | |
| 2018/0013509 A1 | 1/2018 | Meyer et al. | |
| 2018/0109348 A1* | 4/2018 | Salsi | H04J 14/0202 |

OTHER PUBLICATIONS

OIF Optical Internetworking Forum, IA OIF-FLEXE-01.1, Flex Ethernet Implementation Agreement 1.1, Jun. 21, 2017, pp. 1-35.
Vissers et al., ITU International Telecommunication Union, Telecommunication Standardization Sector, Flexible OTN long-reach interface, SG15-TD95 Rev.1/WP3, Study Group 15, Study Period 2017-2020, Geneva, Jun. 19-30, 2017, Editors G.709.flexo-lr, Draft 02 of G.709.flexo-lr, pp. 1-20.
International Telecommunication Union, ITU-T G.709.1/Y.1331.1, Telecommunication Standardization Sector of ITU, Jan. 2017, Flexible OTN short-reach interface, pp. 1-30.
International Telecommunication Union, ITU-T G.709/Y.1331, Telecommunication Standardization Sector of ITU, Jun. 2016, Interfaces for the optical transport network, pp. 1-34.
International Telecommunication Union, ITU-T G.959.1, Telecommunication Standardization Sector of ITU, Apr. 2016, Optical transport network physical layer interfaces, pp. 1-76.
International Telecommunication Union, ITU-T G.8265.1/Y.1365.1, Telecommunication Standardization Sector of ITU, Jul. 2014, Precision time protocol telecom profile for frequency synchronization, pp. 1-32.
International Telecommunication Union, ITU-T G.8275.1/Y.1369.1, Telecommunication Standardization Sector of ITU, Jun. 2016, Precision time protocol telecom profile for phase/time synchronization with full timing support from the network, pp. 1-56.
Apr. 5, 2019 International Search Report issued in International Application No. PCT/US2019/014147.

* cited by examiner

SYSTEMS AND METHODS FOR PRECISE TIME SYNCHRONIZATION WITH OPTICAL MODULES

FIELD OF THE DISCLOSURE

The present disclosure generally relates to optical networking systems and methods. More particularly, the present disclosure relates to systems and methods for precise time synchronization with optical modules, such as pluggable modules.

BACKGROUND OF THE DISCLOSURE

Timing synchronization between nodes in a network is described in various standards such as IEEE 1588-2008 "Standard for a Precision Clock Synchronization Protocol for Networked Measurement and Control Systems," ITU-T G.8265.1/Y.1365.1 "Precision time protocol telecom profile for frequency synchronization," ITU-T G. 8275.1/Y1369.1 "Precision time protocol telecom profile for phase/time synchronization with full timing support from the network," the contents of each is incorporated by reference herein. The requisite information for the transfer of precise time is (1) a time reference point, or "significant instant" to which timing information can be related, (2) the timing information itself, and (3) a measure of the delay it takes to transfer the timing information between two nodes. IEEE 1588-2008 is referred to as Precision Time Protocol (PTP) and is used to synchronize clocks throughout the network. IEEE 1588 facilitates time synchronization by transferring time information in packets between network nodes. To synchronize time, a master clock sends time information to a slave clock. In addition, a round trip delay measurement is used to estimate the delay between the master clock and the slave clock. With the time information from the master and an estimate of the packet delay, the slave clock can synchronize its local time to the master clock. Because a round trip delay measurement is used to estimate the one-way delay, the achievable accuracy of time synchronization at the slave clock is dependent upon the forward and reverse path delays being equal. Any difference between the forward and reverse path delays, known as delay asymmetry, will result in a time error if it is not compensated for.

Systems can compensate for delay asymmetry introduced by optical modules if the delay is static. This is typically acceptable for "gray" client optical modules (i.e., QSFP28 LR4) because these modules do not introduce significant amounts of delay. However, some advanced optical modules may introduce dynamic delays. For example, Digital Coherent Optical (DCO) or Coherent Consortium for On-Board Optics (COBO) modules may map the client signal to an asynchronous server layer such as Optical Transport Network (OTN) or in the case of the Optical Internetworking Forum (OIF) ZR, there is an asynchronous remapping of Alignment Markers (AM). The OIF ZR optical modules typically contain complex Physical Medium Attachment (PMA)/Physical Medium Dependent (PMD) functions and are modeled like an Ethernet extension sub-layer. Additionally, coherent optical modules are likely to employ Soft Decision Forward Error Correction (SD-FEC). These processes can introduce delay asymmetry and uncertainty that is dynamic and unpredictable, leading to inaccurate timing.

In high bandwidth optical transport networks, recent standards such as ITU-T Recommendation G.709 "Interfaces for the optical transport network" (June/2016), the contents of which are incorporated by reference, describe the use of multiple optical carriers for a single digital transport interface in line side applications, such as an Optical Transport Unit-Cn (OTUCn) which is carried via multiple Optical Tributary Signal (OTSi) carriers (lambdas). OTSi is described in G.959.1 "Optical transport network physical layer interfaces" (April/2016), the contents of which are incorporated by reference, as an optical signal that is placed within a Network Media Channel (NMC) for transport across the optical network. This may include a single modulated optical carrier or a group of modulated optical carriers or subcarriers. For client-side applications, ITU-T Recommendation G.709.1 "Flexible OTN short-reach interface" (January/2017) the contents of which are incorporated by reference and future ITU-T Recommendation G.709.3 "FlexO for longer reach interfaces,", define the use of multiple client services/modules for a single OTUCn transport service. Similarly, the Optical Internetworking Forum (OIF) has worked on IA #OIF-FLEXE-01.1 "Flex Ethernet Implementation Agreement" (June/2017), the contents of which are incorporated by reference, for FlexE to transport an Ethernet client service across multiple standard rate client interfaces/servers.

Timing synchronization between nodes in a network is described in various standards such as IEEE 1588-2008 "Standard for a Precision Clock Synchronization Protocol for Networked Measurement and Control Systems," ITU-T G. 8265.1/Y.1365.1 (July/2014) "Precision time protocol telecom profile for frequency synchronization," ITU-T G.8275.1 "Time and Phase Profile," the contents of each is incorporated by reference herein. The requisite information for the transfer of precise time is (1) a time reference point, or "significant instant" to which timing information can be related, (2) the timing information itself, and (3) a measure of the delay it takes to transfer the timing information between two nodes. IEEE 1588-2008 is referred to as Precision Time Protocol (PTP) and is used to synchronize time (frequency and phase) throughout the network. IEEE 1588-2008 only defines a protocol for transferring time information over a packet network. In general, PTP supports accuracy in the sub-microsecond range.

For example, 2×OTSi in an OTSiG (OTSi Group) has two physically independent optical carriers which are transported in the network, but which are logically part of the same group. There is a need to deskew OTSi due to differences in light propagation speed, chromatic dispersion, etc. For creating 2×OTSi into an OTSiG (OTSi Group), most solutions (e.g., Digital Signal Processing (DSP) Application Specific Integrated Circuit (ASIC)) are built in an integrated manner, e.g., in a single die or package. As such, sharing a common time base for deskewing and alignment purposes is less complex were all members of the group are collocated on the same physical device. Since their OTSi members are physically separate signals but treated logically as a group, there is a requirement to deskew these signals to ensure all signals have the same time base.

BRIEF SUMMARY OF THE DISCLOSURE

In an embodiment, an optical module for use in an optical system, wherein the optical module implements Precision Time Protocol (PTP) clock functionality therein, includes an electrical interface with the optical system; circuitry connected to the electrical interface and configured to implement a plurality of functions; an optical interface connected to the circuitry; and timing circuitry connected to the electrical interface and one or more of the plurality of functions, wherein the timing circuitry is configured to implement the PTP clock functionality. The plurality of functions can include management and a datapath and the plurality of functions introduce delay asymmetry in the optical module between a forward direction and a reverse direction in the optical module and the timing circuitry is used to mitigate against delay asymmetry. The plurality of functions can include any of Soft Decision Forward Error Correction, mapping functionality, and coherent modulation.

The PTP clock functionality can include a Transparent Clock. The timing circuitry can determine a timestamp at two point in the plurality of functions and determines a residence time in the optical module. The residence time can be provided to the optical system via one of a field in a PTP message or a follow-up PTP message, each sent over the electrical interface. The PTP clock functionality can also include a timestamping function for use in a Boundary Clock implementation. A signal through the optical module can be compliant to Optical Transport Network (OTN) and the timestamping function can operate based on OTN. The optical module can be compliant to OIF 400ZR, wherein the timing circuitry can utilize reserved bits in Alignment Markers for timestamp references, and wherein PTP messages for the timestamping function are provided over one of an Ethernet data path or the reserved bits. The timing circuitry can obtain an input reference frequency and/or time from the optical system over an existing interface on the electrical interface.

The electrical interface can include one or more pins for a pilot tone to the circuitry in the optical module, and wherein the optical system utilizes the one or more pins for a reference clock input to the optical module. The optical module can be a pluggable optical module compliant to an associated Multi Source Agreement. The optical module can be an on-board optics module.

In another embodiment, an optical module for use in an optical system, wherein the optical module implements Precision Time Protocol (PTP) clock functionality therein, includes an electrical interface with the optical system; Soft Decision Forward Error Correction (SD-FEC) circuitry; mapping and framing circuitry; a coherent modem connected to the SD-FEC circuitry and the mapping and framing circuitry; and timing circuitry connected to the electrical interface, the SD-FEC circuitry, and the mapping and framing circuitry, wherein the timing circuitry is configured to implement the PTP clock functionality.

The PTP clock functionality can include a Transparent Clock. The PTP clock functionality can include a timestamping function for use in a Boundary Clock implementation. The electrical interface can include one or more pins for a pilot tone to the circuitry in the optical module, and wherein the optical system can utilize the one or more pins for a reference clock input to the optical module. The optical module can be a pluggable optical module compliant to an associated Multi Source Agreement. The optical module can be an on-board optics module.

In a further embodiment, a method implemented by an optical module in an optical system includes processing signals in a forward direction from the optical system to a medium; processing signals in a reverse direction from the medium to the optical system; monitoring and determining delay asymmetry between the forward direction and the reverse direction; and performing Precision Time Protocol functionality based on the delay asymmetry.

With OTSi signals originating from separate hardware (e.g., via different optical modules, etc.), there is a requirement to communicate timing for deskewing. Standardized interfaces such as on-board optics via the Consortium for On-Board Optics (COBO) and pluggable modules such as CFP2-DCO, QSFP-DD, etc. have standardized connectors, and these do not support proprietary deskew pins. Accordingly, there is a need for a novel approach for coordinating time base between different optics devices for the purpose of deskewing, aligning, etc.

In an embodiment, an optical system supporting timing synchronization and alignment or deskewing across optical modules includes a plurality of optical devices each providing an Optical Tributary Signal (OTSi) which is part of an Optical Tributary Signal Group (OTSiG); and a management communication mechanism between the plurality of optical devices, wherein each of the plurality of optical devices are timing synchronized using the management communication mechanism and Precision Time Protocol (PTP) messaging. Each of the plurality of optical devices can include delay circuitry configured to deskew an associated OTSi with respect to other OTSi signals in the OTSiG. Each of the plurality of optical devices can include a time base which is synchronized between each of the plurality of optical devices. Each of the plurality of optical devices can be configured to measure relative skew of its OTSi using the time base. The relative skew can be measured for one of a Flexible Ethernet (FlexE) signal based on a shim multiframe and a Flexible Optical (FlexO) signal based on an Optical Transport Unit C (OTUC) Multiframe Alignment Signal (MFAS). The management communication mechanism can include Ethernet.

The management communication mechanism can include one of a standards-based interface based on a Multi Source Agreement (MSA) or Optical Internetworking Forum (OIF) Digital Coherent Optics (DCO), a backplane interface, and an external interface connected via cables. The plurality of optical devices can include pluggable optical modules compliant to one of a Multi Source Agreement (MSA) and Optical Internetworking Forum (OIF) Digital Coherent Optics (DCO). The plurality of optical devices can include standardized on-board optics. The plurality of optical devices can include independent hardware modules. Each of the plurality of optical devices can include a host board and an optical modem. The host board can include an Ethernet switch which is part of the management communication mechanism and connected to other Ethernet switches on other host boards. The host board can include an IEEE 1588 clock which is configured to perform the Precision Time Protocol (PTP) messaging for synchronization. The optical modem can include an IEEE 1588 clock which is configured to perform the Precision Time Protocol (PTP) messaging for synchronization. The optical modem can include delay measurement and control circuitry which is configured to measure delay and to deskew signals.

In another embodiment, an optical modem supporting an Optical Tributary Signal (OTSi) which is part of an Optical Tributary Signal Group (OTSiG) includes a coherent modem; circuitry configured to perform a plurality of Forward Error Correction (FEC), framing, and mapping; a time base which is synchronized with other optical modems in the OTSiG using a management communication mechanism and Precision Time Protocol (PTP) messaging; and delay measurement and control circuitry configured to measure delay, determine a relative skew, and deskew based on a common time base. The optical modem can be a pluggable optical module compliant to one of a Multi Source Agreement (MSA) and Optical Internetworking Forum (OIF) Digital Coherent Optics (DCO). The optical modem can be a standardized on-board optics module. The optical modem can be disposed in an independent hardware module.

In a further embodiment, a method for timing synchronization and deskewing across optical modules includes providing a plurality of an Optical Tributary Signal (OTSi) members each from one of a plurality of optical devices; managing the OTSi members as an Optical Tributary Signal Group (OTSiG); communicating Precision Time Protocol (PTP) messages between the plurality of optical devices for timing synchronization; and deskewing the OTSi members based on relative skew and the timing synchronization.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for precise time synchronization with optical modules. Specifically, the systems and methods include an IEEE-1588 transparent clock and/or timestamping inside a digital coherent optical module (e.g., CFP2-DCO) or onboard optics (e.g., COBO). When including timestamping inside the module, systems housing such modules can implement a transparent clock or boundary clock. The systems and methods can also implement synchronous Ethernet/OTN in the module. The systems and methods make use of the standard defined optical module electrical interface in a novel approach to enable precise timestamping and/or residence time calculation (Management Interface (MI), clock reference input, Inter-Range Instrumentation Group (TRIG)).

Variously, the systems and methods include a Transparent Clock (TC) implemented inside a coherent optical module or on-board optics, a timestamping function implemented inside a coherent optical module or on-board optics, a time base over a clock reference input, a time base over an Ethernet (e.g., Serial Gigabit Media-Independent Interface—SGMII) based MI, a time based over a slow two-wire (e.g., Management Data Input/Output—MDIO) based MI, use of the Optical Internetworking Forum (OIF) 400ZR reserved overhead for a timestamp point of reference, use of a standard MI to communicate PTP timestamps and messages to/from the coherent optical module or on-board optics.

IEEE 1588 is a common way to achieve time synchronization across a network. This protocol facilitates time synchronization by transferring time information in packets between network nodes. To synchronize time, a master clock sends time information to a slave clock. In addition, a round trip delay measurement is used to estimate the delay between the master clock and the slave clock. With the time information from the master and an estimate on the packet delay, the slave clock can synchronize its local time base to the master clock. Because a round trip delay measurement is used to estimate the one-way delay, the achievable accuracy of time synchronization at the slave clock is dependent upon the forward and reverse path delays being equal. Any difference between the forward and reverse path delays, known as delay asymmetry, will result in a time error if it is not compensated for.

Figure 1:
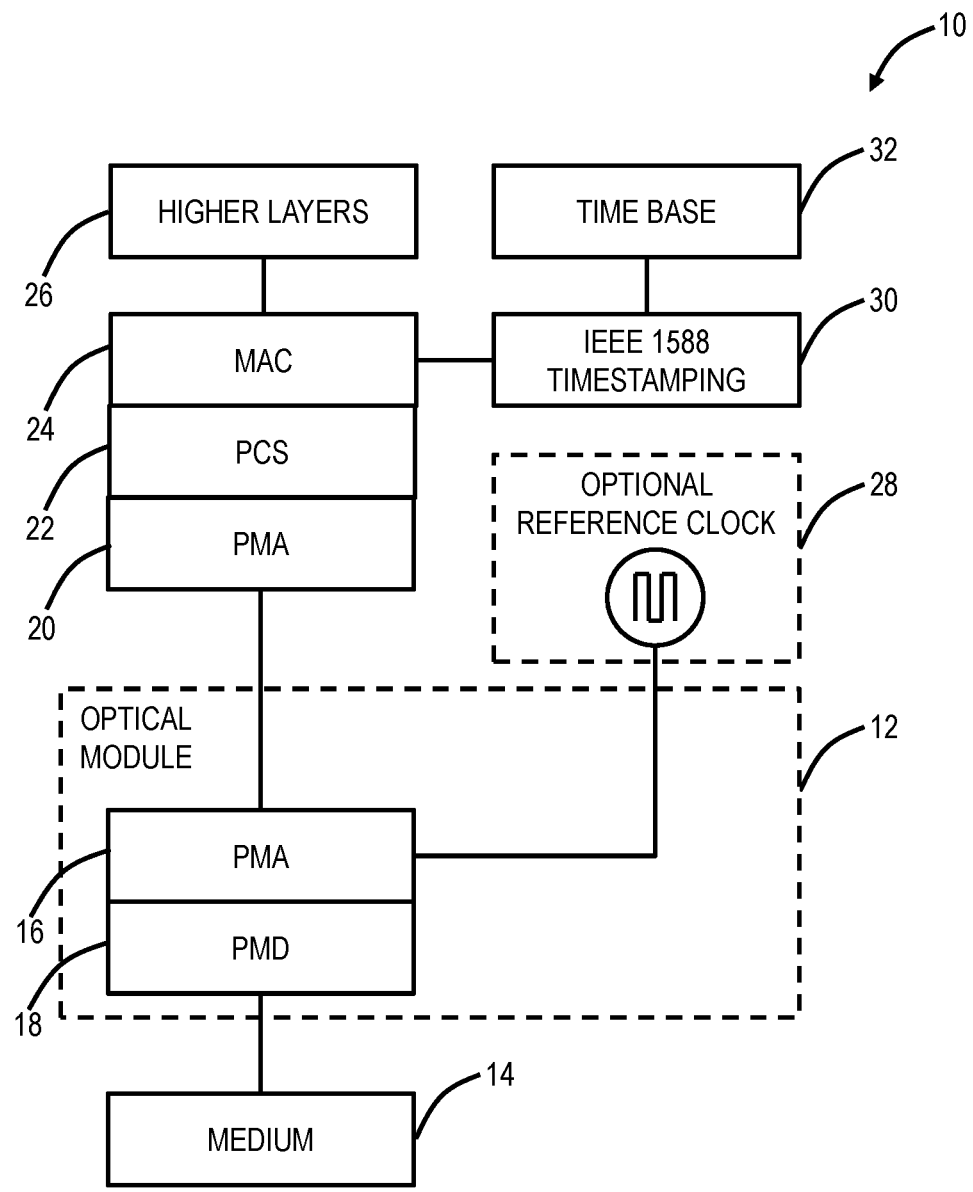
FIG. 1 is a block diagram of a system which supports time or frequency synchronization using IEEE 1588 and which uses an optical module which is IEEE 1588 unaware.

FIG. 1 is a block diagram of a system 10 which supports time or frequency synchronization using IEEE 1588 through a typical optical module 12 which is IEEE 1588 unaware. The optical module 12 can be a pluggable optical module or onboard optics component with a physical interface to a medium 14 (e.g., optical fibers). The optical module 12 includes a Physical Medium Attachment (PMA) layer 16 and a Physical Medium Dependent (PMD) layer 18. The PMA and PMD layers 16, 18 in the optical module 12 may introduce delay asymmetry due to different delays in the forward and reverse directions. However, the delays for such a simple module are known, and the system 10 can compensate for them. This is a common approach to solve this problem.

The system 10 can include a network element, node, etc. housing the optical module 12. The system 10 can also include a PMA layer 20 which connects to the PMA layer 16 in the optical module 12, a PCS layer 22, and a Media Access Control (MAC) layer 24. The MAC layer 24 interacts with higher layers 26 in the system 10. The system 10 includes an IEEE 1588 timestamping module 30 and a time base 32. When the MAC layer 24 timestamps an IEEE 1588 event message with a time from the time base 32 and from the IEEE 1588 timestamping module 30, it can add a fixed offset to compensate for the delay asymmetry that is introduced by the optical module 12. This approach works if the delay introduced by the optical modules 12 is static or constant.

The system 10 can also include an optional reference clock 28 which connects to the PMA layer 16 in the optical module 12. The presence of this reference clock 28 depends on the optical module 12 form factor. For instance, CFP/CFP2/CFP4/CFP8 modules define a reference clock input. On the other hand, QSFP/QSFP-DD and OSFP modules do not define a reference clock input. In the case of CFP/CFP2/CFP4/CFP8, there is no requirement for the phase relationship between the reference clock 28 and the data signals. For COBO modules, there is a clock input reference that is also not required to be phase aligned with the data. COBO also reserves a set of pins for either Ethernet/IP based management or recovered clock output (a choice, not both). The optional reference clock to the module plays no role in PTP for system 10.

Again, the system 10 can compensate for delay asymmetry introduced by the optical module 12 if the delay is static. This is typical acceptable for "gray" client optical modules (i.e., QSFP28 LR4). That is, gray client optical modules do not include advanced functionality such as advanced FEC, coherent modulation, etc. Advanced optical modules may introduce dynamic delays. For example, Digital Coherent Optical (DCO) or Coherent COBO modules may map the client signal to an asynchronous server layer such as OTN or in the case of OIF ZR; there is an asynchronous remapping of Alignment Markers (AM). These optical modules typically contain complex PMA/PMD functions and are modeled like an Ethernet extension sub-layer as in optical modules 12A, 12B in FIGS. 2 and 3.

Figure 2:
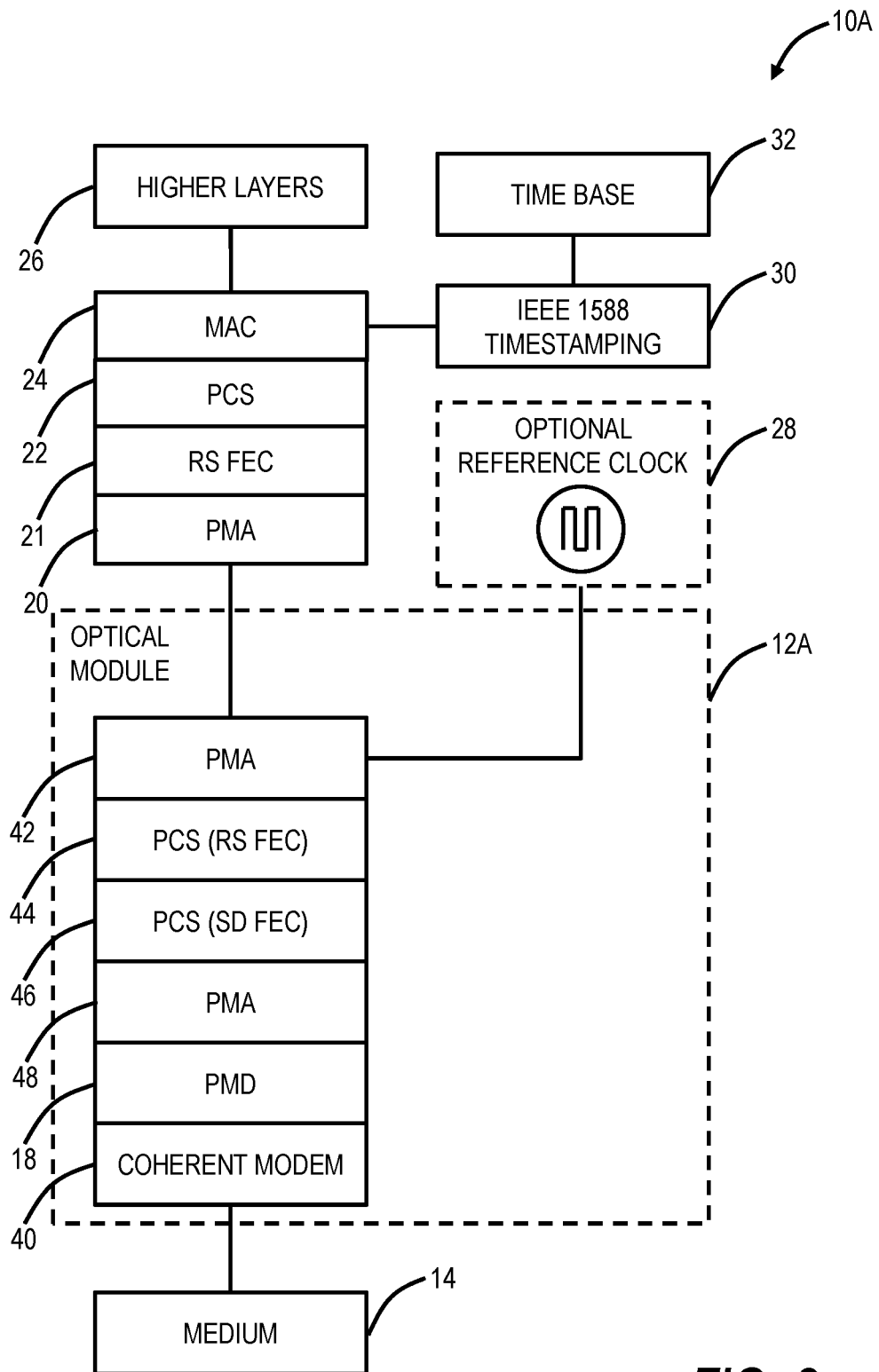
FIG. 2 is a block diagram of a system which supports time or frequency synchronization using IEEE 1588 and which uses a coherent optical module which is IEEE 1588 unaware based on OIF 400ZR (Ethernet Extension)
Figure 3:
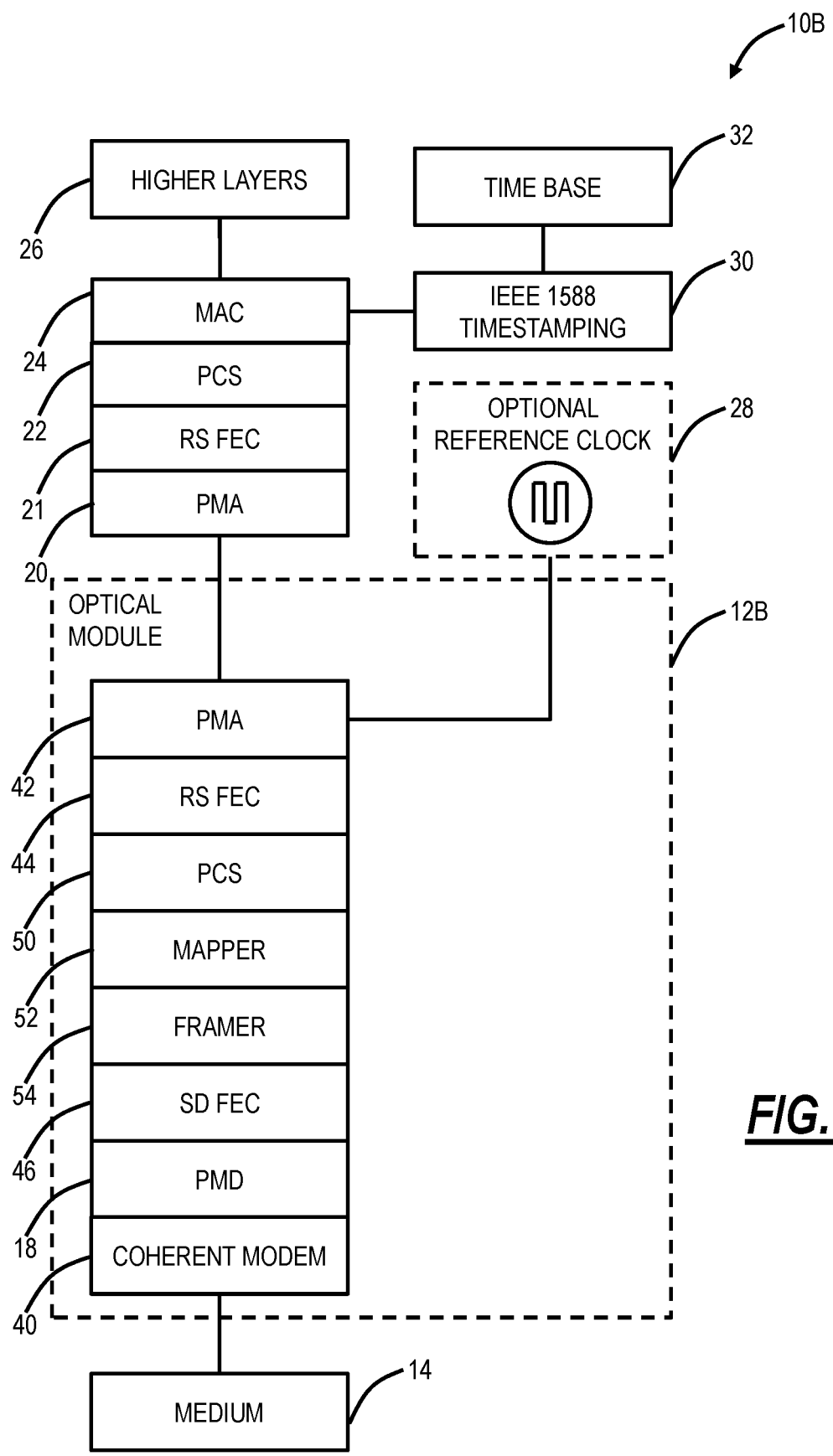
FIG. 3 is a block diagram of a system which supports time or frequency synchronization using IEEE 1588 and which uses a coherent optical module which is IEEE 1588 unaware and with advanced OTN mapping functionality.

FIG. 2 is a block diagram of a system 10A which supports time or frequency synchronization using IEEE 1588 and which uses a coherent optical module 12A which is IEEE 1588 unaware and with advanced functionality. FIG. 3 is a block diagram of a system 10B which supports time or frequency synchronization using IEEE 1588 and which uses a coherent optical module 12B which is IEEE 1588 unaware, includes a coherent modem 40, and with advanced functionality.

The optical module 12A includes a PMA layer 42 connected to the PMA layer 20, an Reed Solomon (RS) FEC layer 44, a Soft Decision FEC (SD FEC) layer 46, another PMA layer 48, and the PMD layer 18. The system 10A in FIG. 2 is similar to the system 10 in FIG. 1 except the optical module 12 has been replaced with one that employs SD-FEC (such as OIF 400ZR for example). The system 10A is typically referred to as an Ethernet extension application.

The coherent optical module 12B includes the PMA layer 42, the RS FEC layer 44, a Physical Coding Sublayer (PCS) layer 50, a mapper 52, a framer 54, the SD FEC layer 46, and the coherent modem 40. The system 10B in FIG. 3 is similar to the system 10 in FIG. 1 except the optical module 12 has been replaced with a DCO module 12B that maps the Ethernet client to a server layer like OTN, via the mapper 52 and the framer 54. In these systems 10A, 10B, the optical modules 12A, 12B may introduce delay asymmetry that is dynamic and unpredictable. Because the delay asymmetry is dynamic, it cannot be compensated for in the timestamp that is inserted by the MAC.

Again, the optical modules 12A, 12B contain complex PMA/PMD functions and are modeled like an Ethernet extension sub-layer. Additionally, the optical modules 12A, 12B may employ the SD FEC. These processes can introduce delay asymmetry and uncertainty that is dynamic and unpredictable.

Again, the present disclosure relates to systems and methods for precise time synchronization with the optical modules 12, 12A, 12B. Specifically, the systems and methods include an IEEE-1588 transparent and/or timestamping function inside a digital coherent optical module (e.g., CFP2-DCO) or onboard optics (e.g., COBO), namely the optical modules 12, 12A, 12B.

Transparent Clock Inside the Optical Module

Figure 4:
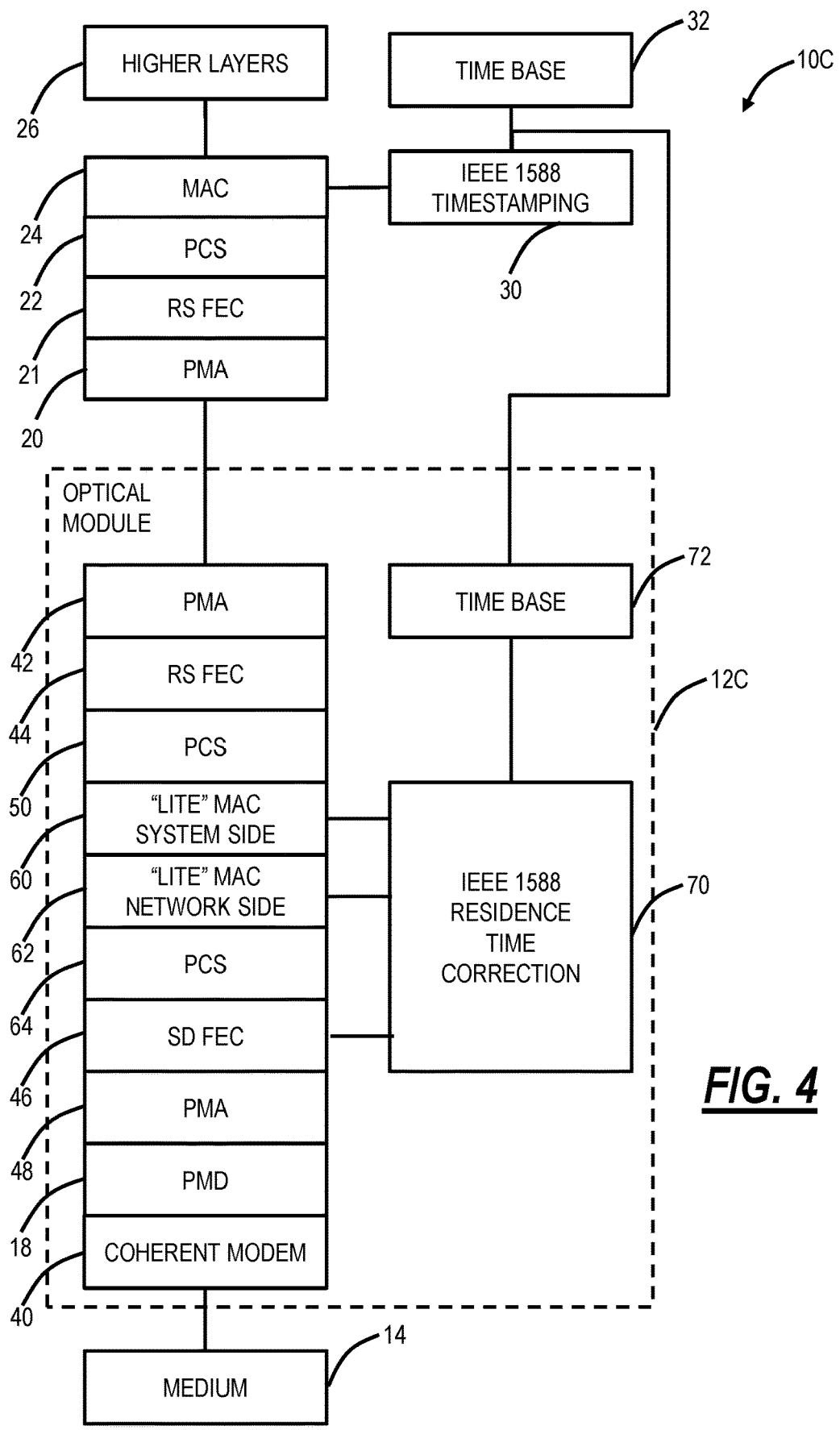
FIG. 4 is a block diagram of a system which supports time or frequency synchronization using IEEE 1588 and which uses a coherent optical module based on OIF 400ZR, which includes a Transparent Clock (TC) inside the optical module.

FIG. 4 is a block diagram of a system 10C which supports time or frequency synchronization using IEEE 1588 and which uses an optical module 12C with advanced functionality such as SD FEC and which includes a Transparent Clock (TC) 70 inside the optical module 12C. The system 10C in FIG. 4 is similar to the system 10A in FIG. 2 with the difference being the TC 70 inside the optical module 12C. The optical module 12C includes the PMA layer 42 connected to the PMA layer 20, the RS FEC layer 44, the PCS layer 50, a "lite" MAC system side layer 60, a "lite" MAC network side layer 62, another PCS layer 64, the SD FEC layer 46, the PMA layer 48, and the PMD layer 18. The optical module 12C can be coherent including the coherent modem 40. Additionally, the optical module 12C includes a TC 70 which is an IEEE 1588 residence time correction module connected to a time base 72 which connects to the timestamping module 30 and the time base 32 in the system 10C. The TC 70 is connected to the layers 46, 60, 62.

Figure 5:
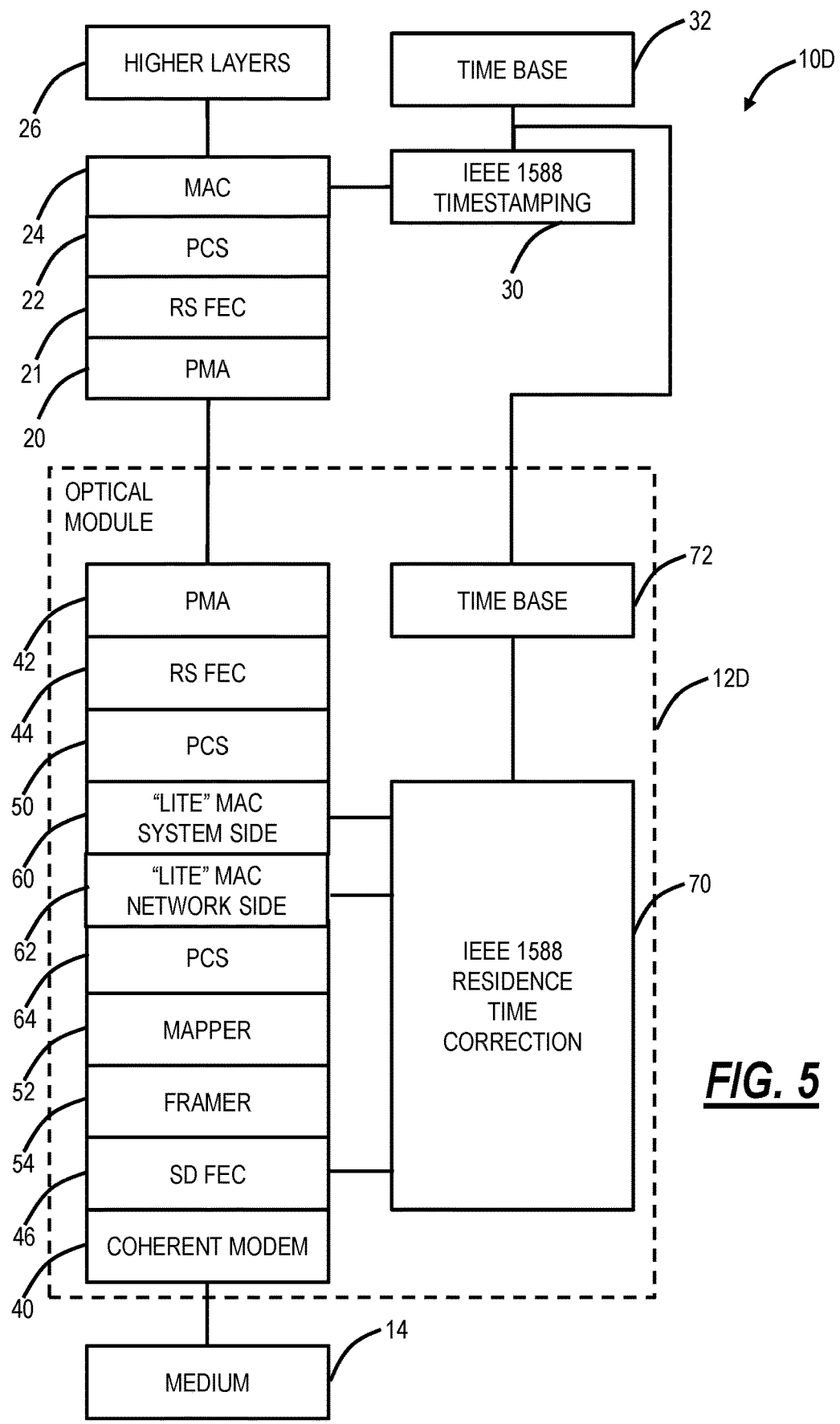
FIG. 5 is a block diagram of a system which supports time or frequency synchronization using IEEE 1588 and which uses a coherent optical module with advanced OTN functionality which includes a Transparent Clock (TC) inside the optical module.

FIG. 5 is a block diagram of a system 10D which supports time or frequency synchronization using IEEE 1588 and which uses an optical module 12D with advanced functionality such as SD FEC and the coherent modem 40, and which includes a Transparent Clock (TC) 70 inside the optical module 12C. The system 10D in FIG. 4 is similar to the system 10B in FIG. 3 with the difference being the TC 70 inside the optical module 12D. The optical module 12D includes the PMA layer 42 connected to the PMA layer 20, the RS FEC layer 44, the PCS layer 50, a "lite" MAC system side layer 60, another PCS layer 64, the mapper 52, the framer 54, the SD FEC layer 46, and the coherent modem 40. The optical module 12D can be coherent including the coherent modem 40. Additionally, the optical module 12D includes a TC 70 which is an IEEE 1588 residence time correction module connected to a time base 72 which connects to the timestamping module 30 and the time base 32 in the system 10C. The TC 70 is connected to the layers 46, 60, 62.

IEEE 1588-2008 introduces a new type of clock called a Transparent Clock (TC). A TC is a multi-port device that forwards PTP messages, measuring the time taken for event messages to pass through the device, and accounts for this so-called residence time by modifying the message, or by sending a separate follow-up message. The other clocks in the system 10C use the delay measured by the TC to compensate for the additional latency introduced between master and slave clocks. In this sense, the TC can be made to "disappear," hence the name "transparent."

The optical module 12C, 12D overcomes the delay asymmetry problems described herein by implementing the TC 70 inside the optical module 12C, 12D. The functionality of the TC 70 operates as described in IEEE 1588-2008. Specifically, a timestamp, T1, is captured at a Start of Frame (SOF) delimiter of an IEEE 1588 event message is detected, such as at one of the layers 46, 60, 62, 64. Another timestamp, T2, is captured at a SOF delimiter of the IEEE 1588 event message is detected at another of the layers 46, 60, 62, 64. A residence time inside the optical module 12C, 12D can be determined as Residence Time (RT)=T2−T1. The residence time can be communicated outside the optical module 12C, 12D to the timestamping module 30 and the time base 32. For example, the residence time can be communicated outside the optical module 12C, 12D through updating a correction field of the IEEE 1588 event message or via a follow-up message according to IEEE 1588. The updating a correction field is performed inside the optical module 12C, 12D, and the follow-up message can be provided inside or outside of the optical module 12C, 12D.

An error in the residence time is introduced if the optical module's 10C, 10D internal time base 72 is not synchronized in frequency to the master clock (i.e., the time base 32). The error is equal to the frequency offset times the latency between the ingress and egress timestamp capture.

In order to synchronize time base 72 in the optical module 12C, 12D to the master clock, a reference clock input can be used. These are typically standard pins on DCO and COBO modules, but they are not meant for this purpose. The reference clock input on typical modules is typically only used to provide a pilot tone to the internal Clock and Data Recovery (CDR) circuits. Also, the optical modules 10C, 10D can insert PTP messages in the line PCS, OTN frame or SD-FEC wrapper (or 400ZR equivalent).

Timestamping Inside the Optical Module for a Boundary Clock Function

Figure 6:
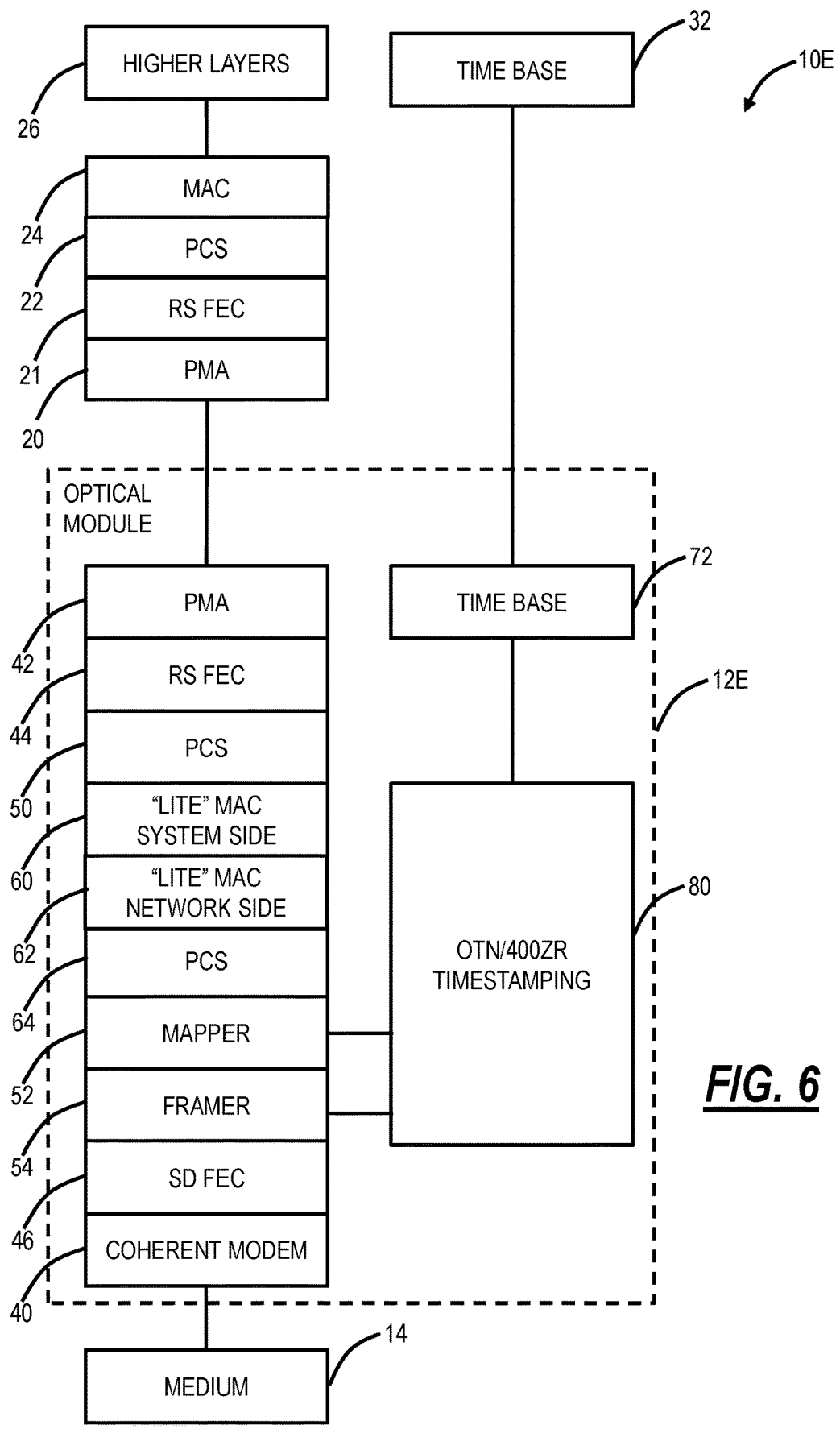
FIG. 6 is a block diagram of a system which supports time or frequency synchronization using IEEE 1588 and which uses an optical module with advanced functionality such as SD FEC and the coherent modem, and which includes timestamping function inside the optical module that allows a system to implement a Boundary Clock (BC)

FIG. 6 is a block diagram of a system 10E which supports time or frequency synchronization using IEEE 1588 by implementing a Boundary Clock (BC) through a timestamping function 80 and which uses a coherent optical module 12E with advanced functionality such as SD FEC and the coherent modem 40, and which includes a timestamping function 80 inside the optical module 12E. The system 10E can overcome the delay asymmetry added by the coherent optical module 12E by implementing the timestamping function 80 inside the optical module 12E instead of using the host MAC device (layer 2), which essentially moves this function closer to the line transmitter/receiver. IEEE 1588-2002 describes Boundary Clocks. A Boundary Clock (BC) is a clock node that has two or more ports. A BC generally has one port in the role of a slave clock and the remaining ports in the role of master clocks. In this case, the BC recovers the time of day within the slave clock function and relays it as a reference to the master clock functions.

The timestamping function 80 can operate as described in G.709 if the server is OTN. If the optical module 12E is based on OIF 400ZR, the timestamping function 80 is new and described in additional detail herein. The timestamping function 80 connects to the framer 54 and the SD FEC layer 56.

Assuming the server is OTN, a timestamp, T1, is captured at a multi-frame boundary detected at the transmitter. If the server layer is OTN in the coherent optical module 12E, then this would be based on OTN Multi-Frame Alignment Signal (MFAS). The host sends a sync message over the MI. The timestamp value is inserted in the sync message that originated from the host. The sync message can be carried in-band in the data plane or out of band using server (i.e., OTN) overhead. The function is similar for the receiver where the timestamp is extracted from the sync message and correlated to the received multi-frame boundary.

This timestamp function 80 requires that its time base 72 be synchronized in frequency, phase, and time to the system time base 32. The next section provides details on how this could be done. Specifically, the systems and methods utilize existing interfaces (e.g., pins defined in MSAs, etc.) to provide the time base 32 to the time base 72 ensuring synchronization between the optical module 12C, 12D, 12E and the system 10C, 10D, 10E.

Time Base Over a Clock Reference Input

The optical modules 12C, 12D, 12E typically only define an input reference clock, which is used as a pilot for CDR circuits. In an embodiment, the systems and methods repurpose the input reference clock pins to provide time and frequency (i.e., the time base 32 to the time base 72) to an optical module 12C, 12D, 12E for 1588/PTP functions inside the optical module 12C, 12D, 12E. A scheme like TRIG can be used to provide this information.

Time Base Over SGMII Based MI:

Some standards (CFP2-DCO and COBO) have reserved a set of pins for the purpose of an Ethernet/SGMII based MI. The interface can be synchronized in frequency to provide the optical module 12C, 12D, 12E a master clock (i.e., the time base 32 to the time base 72). Alternatively, the interface can also be synchronized for Synchronous Ethernet/Optical (SyncE/O) (both transmitted and recovered clock) applications.

Time Base Over MDIO/I2C Based MI

A Management Data Clock (MDC) clock can be used to provide a frequency reference, and the MDIO data can be used to provide phase/time. Also, Inter-Integrated Circuit (I2C) can also be used. For example, time information can be transfer to the modules by writing a register and 1 Hz phase can be provided by using a precisely timed a write sequence to a particular register address.

PTP Message Transfer Over MI

The management interface, being Ethernet-based (e.g., SGMII) or two-wire (MDIO, I2C), could be used for the purpose of communicating IEEE 1588 PTP messages for Transparent Clock and Boundary Clock applications.

PTP on OIF 400ZR Applications

OIF 400ZR is a new scheme that is not based on OTN and does not implement OTN wrapping inside the coherent optical module. OIF 400ZR is a standard for transmitting 400 Gb/s Ethernet over data center interconnection links up to 120 km using Dense Wavelength Division Multiplexing (DWDM) and higher order modulation such as 16 Quadrature Amplitude Modulation (QAM). OIF 400ZR is proposed to be available in small form factor modules such as OSFP or QSFP-DD.

In FIG. 6, assuming the server is OIF 400ZR, the mapper 52 and the framer 54 would be omitted. OTN currently defines schemes to implement PTP. However, OIF 400ZR is not based on OTN and does not implement OTN wrapping inside the coherent optical module. Rather, OIR 400ZR is an Ethernet extension scheme where new AMs (alignment markers) are used on the coherent line, and a new FEC (Concat FEC) is added to the Ethernet structure. In order to implement IEEE 1588, and mitigate against the delay uncertainties added by the OIF 400ZR coherent optical modem, a new timestamp reference has to be defined. For OIF 400ZR, the systems and methods could use reserved bits inside of the OIF 400ZR AMs and create a "multiframe concept" on the order of 200-300 µs for the timestamp point of reference. This is a scheme analogous to what is done for PTP over OTN but uses the structure of OIF 400ZR framing. The PTP message itself can either be injected in the Ethernet data path (Layer 2) or could again use reserved overhead in the OIF 400ZR AMs for its own sync channel (Layer 1).

System and Optical Module

The various systems 10, 10A, 10B, 10C, 10D, 10E can be network elements, nodes, etc. including a switch, a router, a DWDM platform, an OTN switch, a Packet Optical Transport System (POTS), etc. That is the systems 10, 10A, 10B, 10C, 10D, 10E are network elements operating in a network, and the optical modules 12, 12A, 12B, 12C, 12D, 12E are devices incorporated in the network elements for optical connectivity with adjacent network elements. The purpose of IEEE 1588 PTP and the like is to ensure clock synchronization between the network elements. With the systems and methods described herein, delay asymmetry due to the optical modules 12C, 12D, 12E between the network elements is addressed.

Group Alignment

In various embodiments, the present disclosure relates to systems and methods for precise time synchronization across optical modules for Flexible Optical (FlexO) or Flexible Ethernet (FlexE) group alignment. The systems and methods utilize IEEE 1588 PTP to synchronize time across coherent optical modems to enable FlexO or FlexE alignment. In the source (generating) functions, this FlexE/O alignment is the process of creating members (OTC or FlexE) with the same frequency and same (multi-)frame locations. In the sink (terminating) functions, this FlexO/E alignment is the process of deskewing members (OTUC or FlexE shim) that are transported across various OTSi (carriers, lambdas) in an OTSiG (group, media channel). The various OTSi are subject to chromatic dispersion and can experience skew differences up to ~7 μs when propagated across a long-haul optical path. The FlexE/FlexO alignment is also needed to drive standard consequent actions, for example, an Optical Data Unit Cn (ODUCn, where C=100 and n=1, 2, 3, . . . ) Alarm Indication Signal (AIS). The systems and methods make use of standard defined optical module electrical interfaces or existing line card backplane interfaces or product/shelf Internal Local Area Network (ILAN) interface in a novel way to enable grouping for FlexE and FlexO across multiple optical modems. These optical modems can be located on a single card, can be distributed on multiple line cards/slots (in a shelf), or can even be distributed across multiple shelves (i.e., pizza box stacking).

Figure 7:
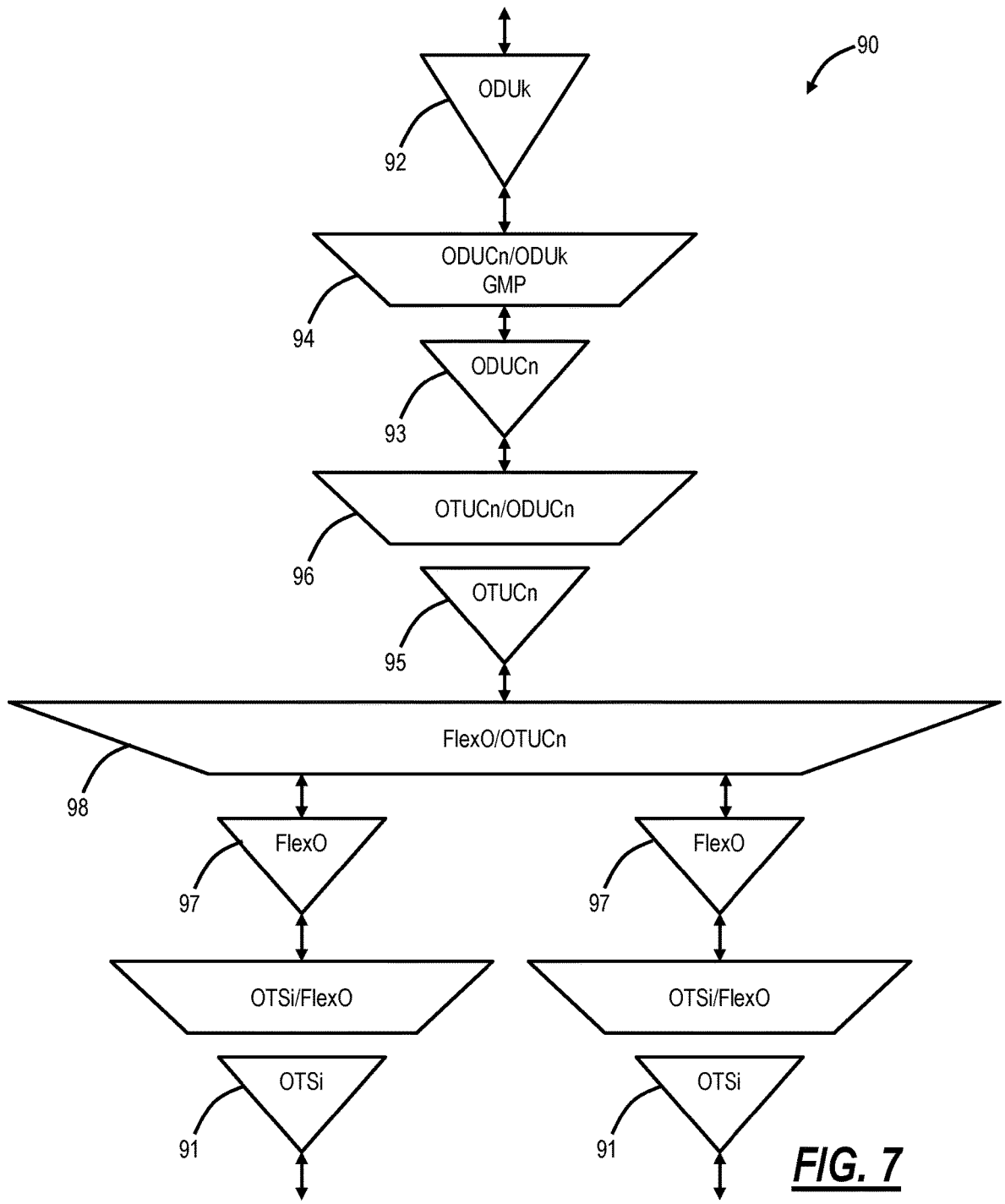
FIG. 7 is a logical diagram of an Optical Transport Unit Cn (OTUCn, C=100, n=1, 2, 3, . . . ) transport signal carried across 2 Optical Tributary Signal (OTSi) carriers.

FIG. 7 is a logical diagram of an Optical Transport Unit Cn (OTUCn, C=100, n=1, 2, 3, . . . ) transport signal 90 carried across 2 Optical Tributary Signal (OTSi) 91 carriers. In this example, the OTUCn transport signal 90 is an OTUC4, i.e., 400G carried across 2×200G OTSi. Starting at the top of FIG. 7, an Optical Data Unit k (ODUk) 92 is mapped to an Optical Data Unit Cn (ODUCn) 93 via Generic Mapping Procedure (GMP) ODUCn/ODUk 94. The ODUCn 93 is mapped to an OTUCn 95 via OTUCn/ODUCn adaptation 96. The OTUCn 95 are mapped to a sink FlexO function 97 via FlexO/OTUCn mapping 98. The sink FlexO function 97 must align and perform deskewing (based on G.798 logical lane alignment) to reconstitute the OTUCn (i.e., OTUC4 400G) transport signal. The deskewing can be performed based on G.798 "Characteristics of optical transport network hierarchy equipment functional blocks" (December/2012), the contents of which are incorporated by reference, and the logical lane alignment. In order to do this, it must use OTUC multiframe boundaries and a common reference time based across the members in the group. In server signal failures, the source FlexO function needs to drive an ODUCn-AIS with ODUC slices aligned.

Figure 8:
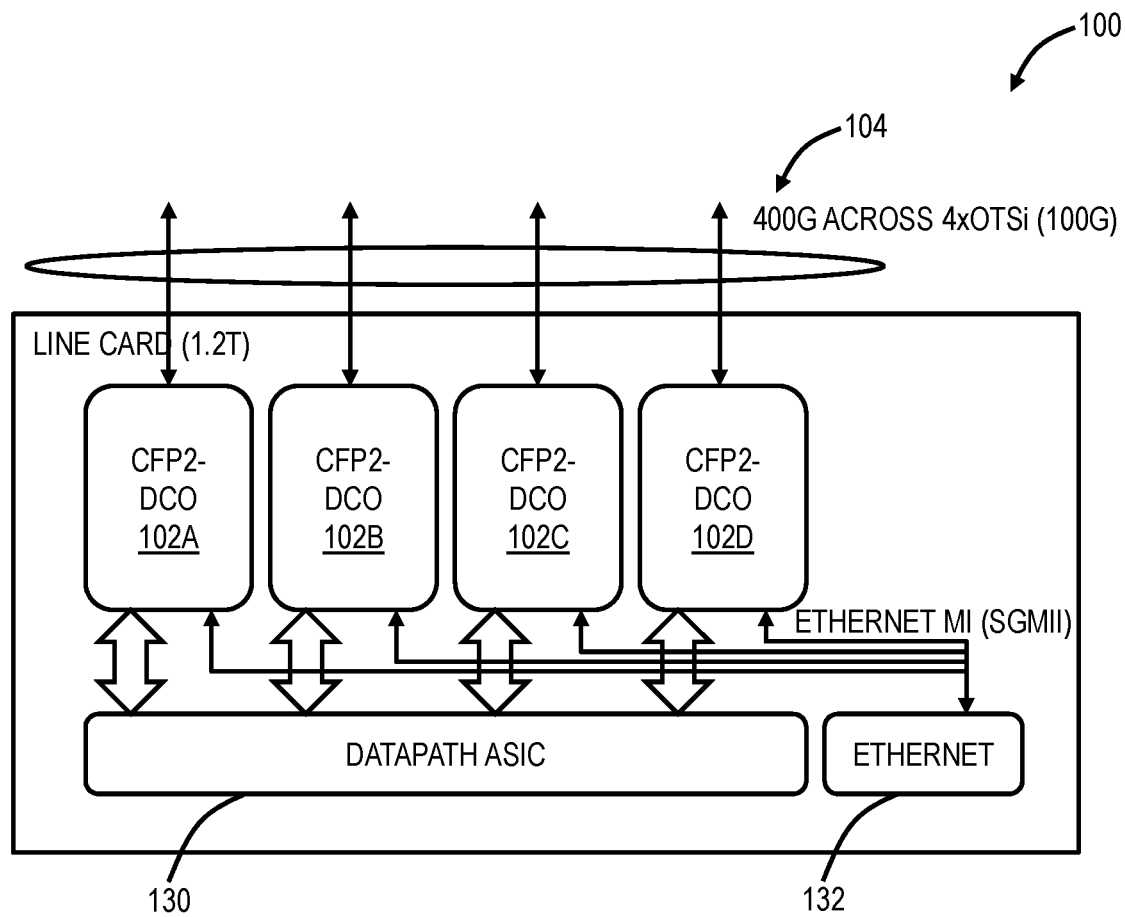
FIG. 8 is a block diagram of a line card supporting multiple pluggable optical modules forming a single OTSi Group (OTSiG)
Figure 9:
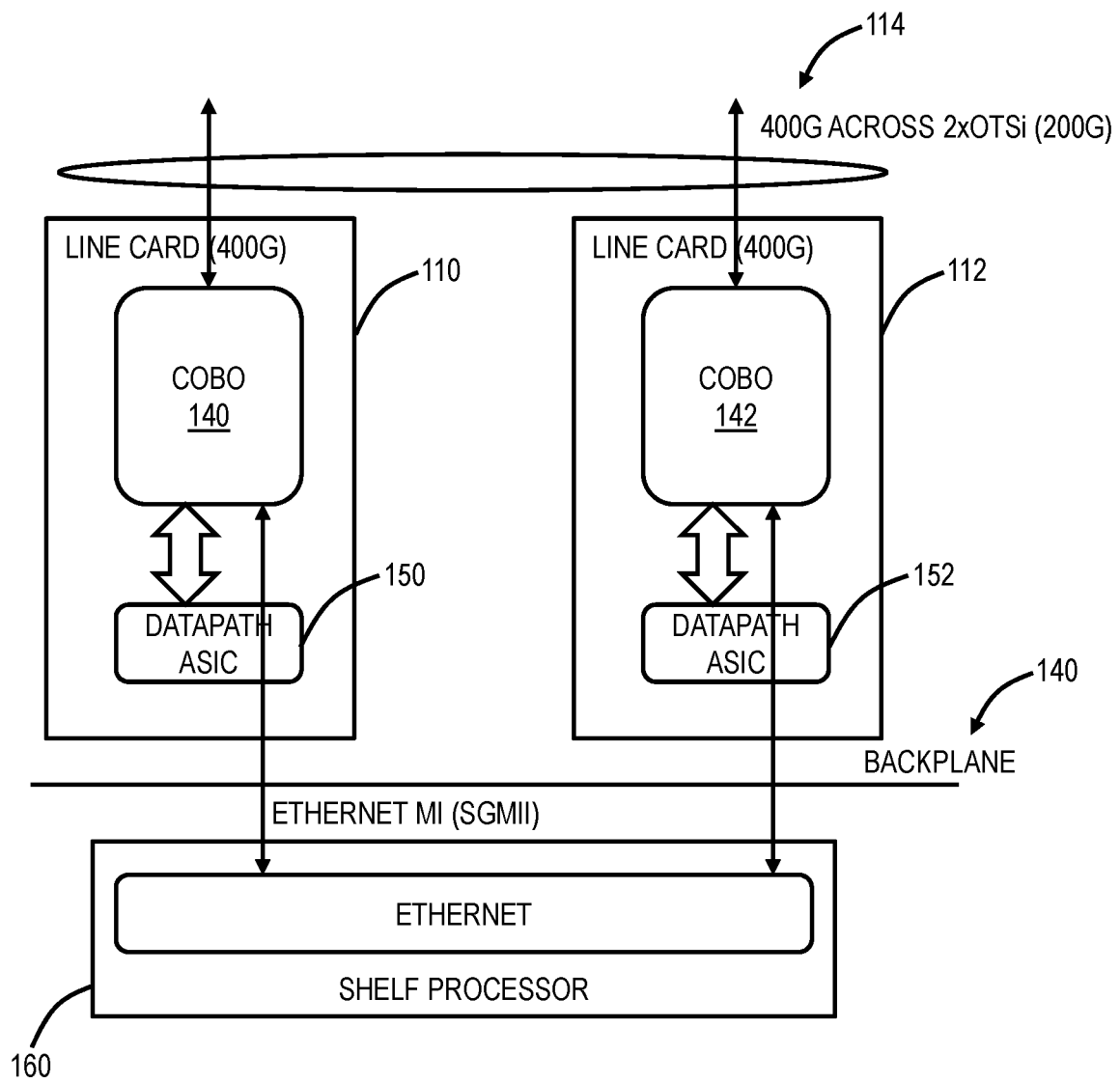
FIG. 9 is a block diagram of multiple line cards collectively supporting a single OTSiG.
Figure 10:
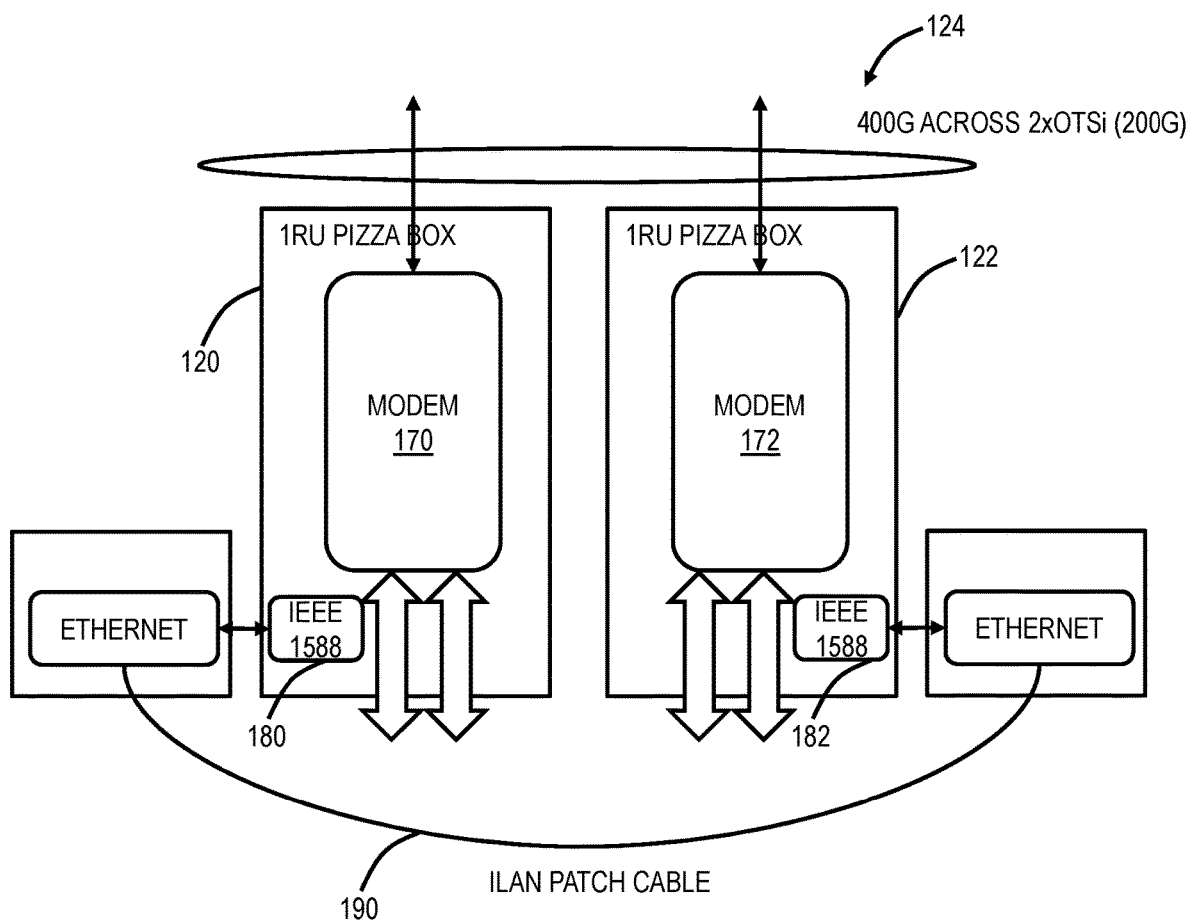
FIG. 10 is a block diagram of multiple hardware modules (e.g., "pizza boxes") collectively supporting a single OTSiG.

FIG. 8 is a block diagram of a line card 100 supporting multiple pluggable optical modules 102A-102D forming a single OTSiG 104. FIG. 9 is a block diagram of multiple line cards 110, 112 collectively supporting a single OTSiG 114. FIG. 10 is a block diagram of multiple hardware modules 120, 122 (e.g., "pizza boxes") collectively supporting a single OTSiG 124. Each of these examples illustrates multiple hardware devices forming a single OTSiG 104, 114, 124. Those skilled in the art will recognize other embodiments are also contemplated.

In FIG. 8, there are four example pluggable optical modules 102A-102D which are CFP2-DCO (Digital Coherent Optics). CFP2-DCO is standardized by the OIF. For example, the CFP2-DCO can each support 100G to 200G to 400G. Assume each of the pluggable optical modules 102A-102D supports 100G, so the line card 100 support 400G across 4×OTSi (100G). The pluggable optical modules 102A-102D each are connected to data path circuitry 130 (data path ASIC). Further, each of the pluggable optical modules 102A-102D supports an Ethernet MI (SGMII) interface 132 which is a Serial Gigabit Media-Independent Interface (SGMII).

In FIG. 9, there are two separate line card 110, 112 which can be housed in a backplane 140 in a shelf/chassis. The line cards 110, 112 each include a COBO module 140, 142. The COBO modules 140, 142 are standardized through the Consortium for On-Board Optics (COBO) (onboardoptics.org/) and these modules are standardized for mounting on Printed Circuit Boards (PCBs) and the like. For example, each of the COBO modules 140, 142 can support 200G to 400G. Assume each of the COBO modules 140, 142 supports 200G so that the two line cards 110, 112 can support 400G across 2×OTSi (200G). Each of the COBO modules 140, 142 can include data path circuitry 150, 152 and connect to a shelf processor 160 via an Ethernet MI (SGMII) interface over the backplane 140.

In FIG. 10, there are two separate hardware modules 120, 122 which can be referred to as "pizza boxes" which are 1-2 Rack Unit (RU) sized, self-contained chassis. Each hardware module 120, 122 includes an optical modem 170, 172 which can be a proprietary design or standardized design. The optical modems 170, 172 can support 200G to 400G. Assume each optical modem 170, 172 supports 200G for 400G across 2×OTSi (200G). Each of the hardware modules 120, 122 can include an IEEE 1588 clock 180, 182 which can operate PTP and connect between to one another via an Ethernet connection such as an Internal LAN (ILAN) cable 190 between the hardware modules 120, 122.

In various embodiments, the systems and methods utilize IEEE PTP synchronization messages between the pluggable optical modules 102A-102D, the line cards 110, 112, the hardware modules 120, 122 on a standard Ethernet-based management interface, across optical module boundaries (i.e., CFP2-DCO) or across line cards (slots) or product box boundaries (i.e. ILAN). This can be used to provide the common time base to the separate modems for FlexE or FlexO.

FIGS. 8-10 illustrate non-limiting examples of how modems can be grouped and the Ethernet-based MI can be used between them to set up a common time base.

Figure 11:
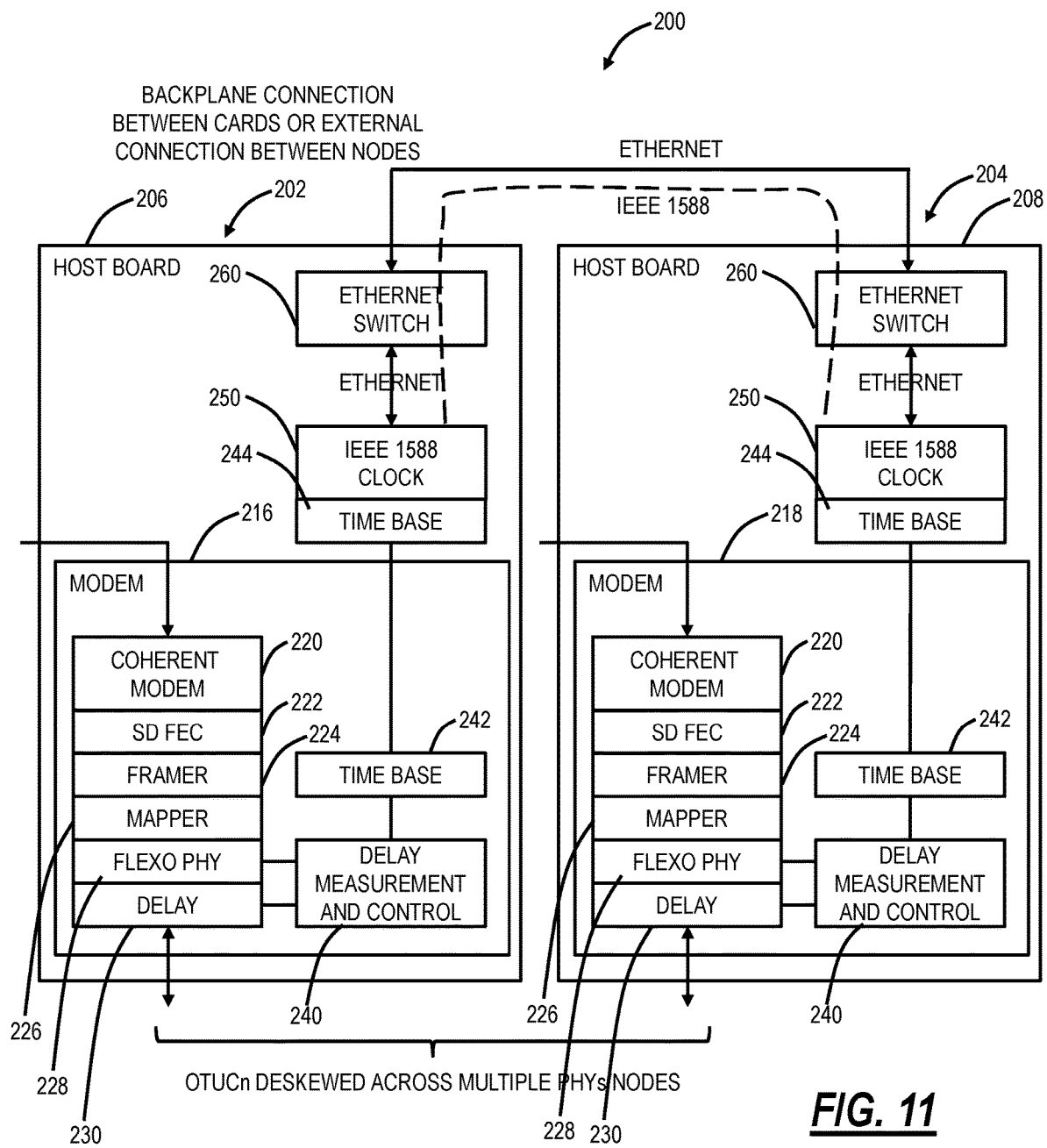
FIG. 11 is a block diagram of a system of two optical devices with IEEE 1588 PTP functionality implemented on host boards.
Figure 12:
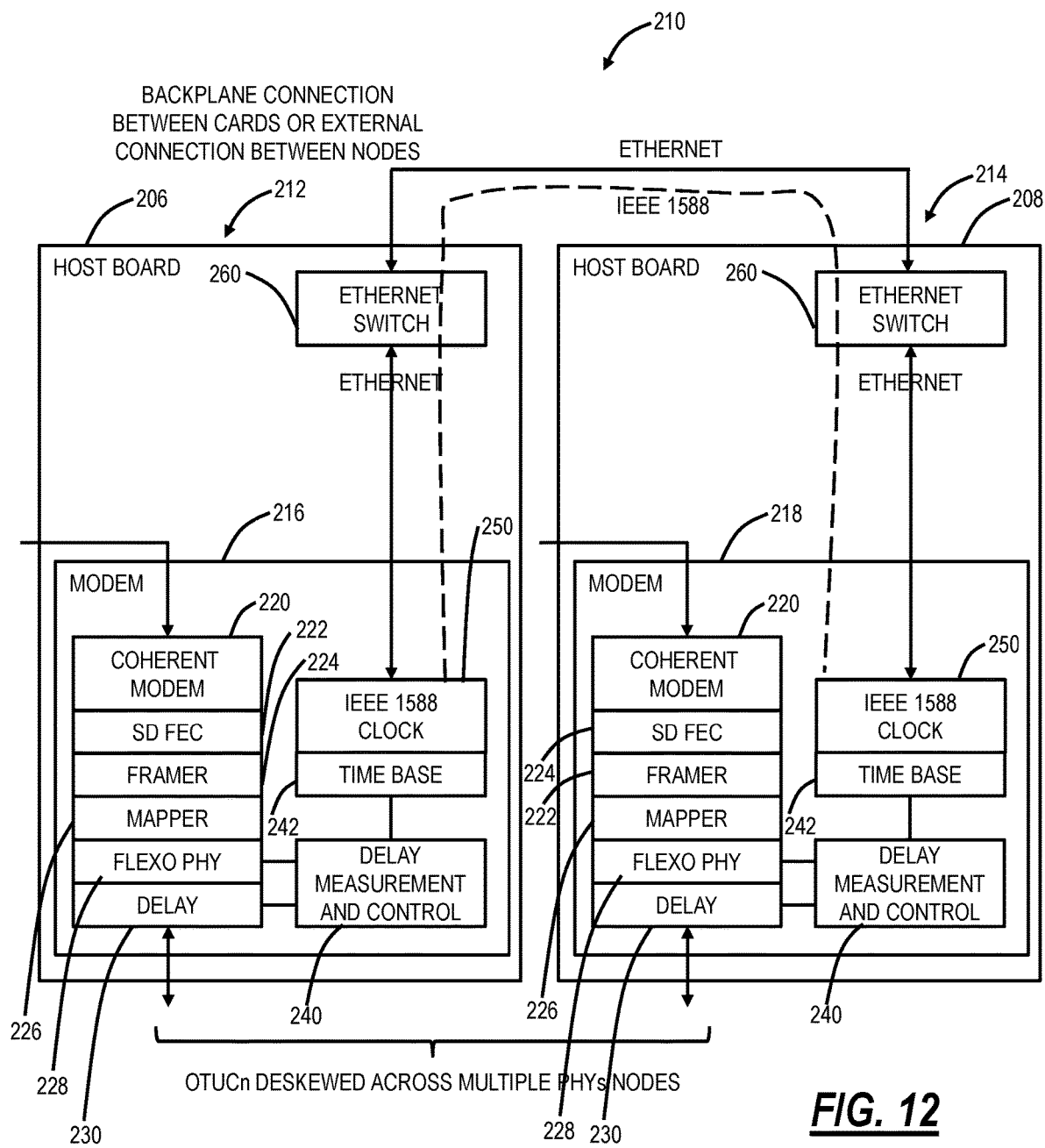
FIG. 12 is a block diagram of a system of two optical devices with IEEE PTP functionality implemented in optical modems.

FIG. 11 is a block diagram of a system 200 of two optical devices 202, 204 with IEEE 1588 PTP functionality implemented on host boards 206, 208. FIG. 12 is a block diagram of a system 210 of two optical devices 212, 214 with IEEE PTP functionality implemented in optical modems 216, 218. Specifically, FIGS. 11 and 12 illustrate the associated functionality of optical devices which are configured in an OTSiG and which include IEEE 1588 PTP for time synchronization and associated functionality for alignment. In FIG. 11, the IEEE 1588 PTP functionality is implemented on the host boards 206, 208 which can be PCBs, etc. and in FIG. 12, the IEEE 1588 PTP functionality is implemented on the optical modems.

The optical modems 216, 218 include a coherent modem 220, Soft Decision (SD) Forward Error Correction (FEC) circuitry 222, a framer 224, a mapper 226, FlexO Physical (PHY) hardware 228, and delay circuitry 230. The optical modems 216, 218 include delay measurement and control circuitry 240 which is configured to determine the delay associated with signals through the coherent modem 220, the circuitry 222, the framer 224, the mapper 226, the hardware 228, and the circuitry 230. The delay measurement and control circuitry 240 also is configured to perform deskewing as described herein. The delay measurement and control circuitry 240 connects to a time base 242 on the optical modules 216, 218. The time base 242 keeps a time value for the optical modules 216, 218 and the objective is to ensure a common time base between the optical devices 202, 204. Also, FIGS. 11 and 12 illustrate two optical devices 202, 204, but those skilled in the art will recognize the systems and methods can operate with a single optical device (and multiple optical modems 216, 218) or with more than two optical devices 202, 204.

The delay measurement and control circuitry 240 provides the delay using the time base 242 which is synchronized with other devices 202, 204 and their time base 242 using IEEE PTP. The delay measurement and control circuitry 240 also uses the time base 242 to deskew signals, e.g., delaying via the delay circuitry 230 such that the signals are at the rate of the latest signal in the OTSiG (or any other approach to deskewing).

In FIG. 11, the time base 242 connects to a time base 244 on the host boards 206, 208 and the time base 244 connects to an IEEE 1588 clock 250 which is configured to implement the PTP functionality. The IEEE 1588 clock 250 connects via Ethernet to an Ethernet switch 260 on the host boards 206, 208 and the Ethernet switches 260 are connected to one another, such as via a cable, via backplane interfaces, etc. In FIG. 12, the time base 242 connects to the IEEE 1588 clock 250 which is in the optical modem 216, 218. The IEEE 1588 clock 250 connects to the Ethernet switch 260.

The systems and methods utilize a standard module interface (Ethernet MI in CohOBO or CFP2-DCO), existing backplane interfaces (1000BT) or standard shelf external interface (ILAN), and overlays PTP/1588 sync messages for the purpose of distributing a common time base for distributed deskewing and aligned consequent actions.

IEEE 1588 PTP functionality is well defined for the purpose of communicating a time base over a standard Ethernet or Optical Transport Network (OTN) interfaces. IEEE 1588 PTP functionality uses timestamps, symmetrical RX/TX delays, and specific sync messages to communicate frequency and phase (time) across an interface. The IEEE 1588 clock 250 can perform this functionality with one another to ensure every optical device 202, 204 shares the same time base 242.

For the purpose of the systems and methods, 300 ns of accuracy is needed to align the OTUC (FlexO) slices or shims (FlexE), and this is specified in FlexE and FlexO standards. The implementation can include a servo/PTP function built into the modem module boundary. Other implementations can include the servo/PTP function on a host card and assist the modem module with discrete signals.

Once a common time base is established between modules, in the FlexO/FlexE sink functions 26, 28, it can be used to measure relative skew of the OTSi members. For FlexE, this time base would be used to measure the arrival of the shim multiframe. For FlexO, this time base would be used to measure the arrival of the OTUC Multiframe Alignment Signal (MFAS). Once all member skews are measured, the optical devices 202, 204 can figure out the latest (most delayed) member and set a delay element (buffer) such as the delay circuitry 230 in the data path to all other members to match the worst-case. This essentially deskews all members to a common phase. In the source function, the common time base can be used to align (within 300 ns) the OTUC/ODUC frame boundaries and provide a unified ODUCn AIS.

Example Network Element

Figure 13:
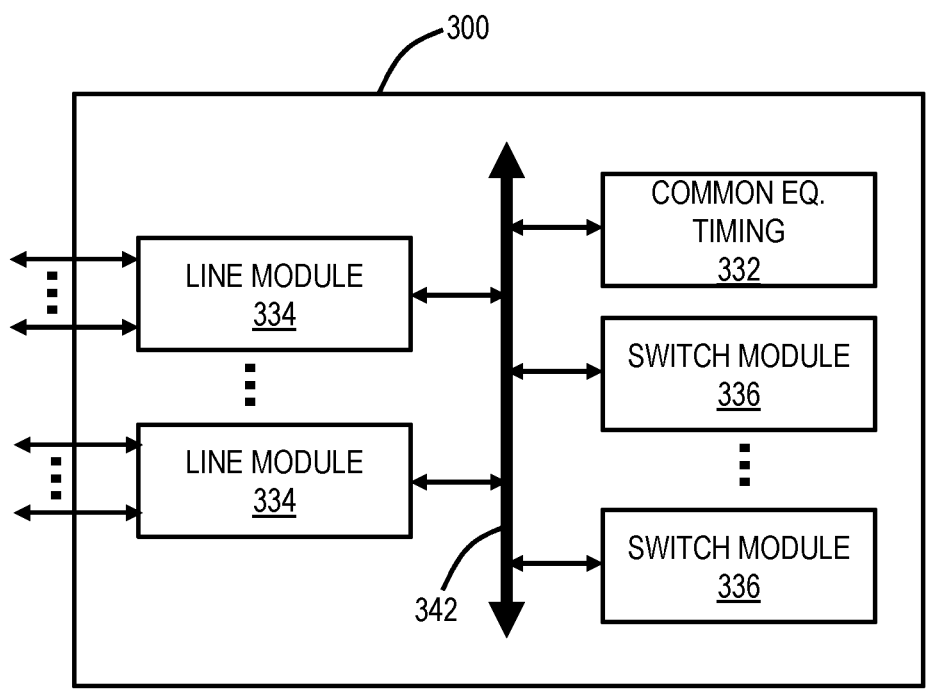
FIG. 13 is a block diagram of an example network element for use with the systems and methods described herein.
Figure 14:
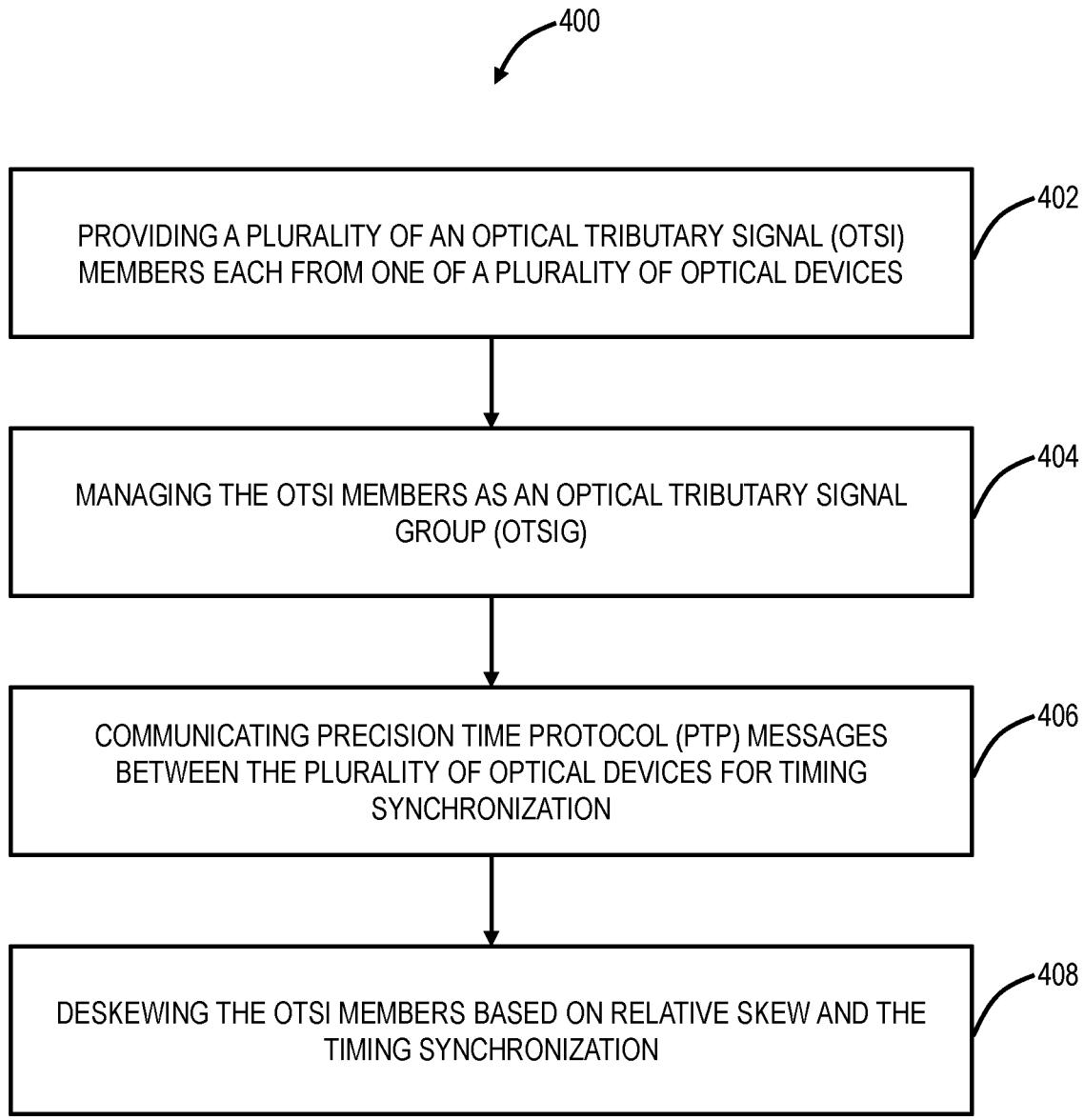
FIG. 14 is a process for timing synchronization, deskewing, and aligning across optical modules.

FIG. 13 is a block diagram of an example network element 300 for use with the systems and methods described herein. For example, the network element 300 may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 300 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 300 can be any digital system and with ingress and egress digital signals and switching of channels, timeslots, tributary units, etc. Also, the network element 300 can be an optical system with ingress and egress of wavelengths and switching of wavelengths. Further, the network element 300 can be a combination of a digital and optical system. While the network element 300 is generally shown as an optical network element, the systems and methods contemplate use with any system which hosts the optical devices 202, 204 and which performs system level timing synchronization and deskewing. Also, While the network element 300 is generally shown as an optical network element, the systems and methods contemplate use with any system which hosts the optical modules 12C, 12D, 12E and which performs system level timing synchronization.

In an embodiment, the network element 300 includes common equipment 332, one or more line modules 334, and one or more switch modules 336. The common equipment 332 can include power; a control module; Operations, Administration, Maintenance, and Provisioning (OAM&P) access; user interface ports; and the like. The network element 300 can include an interface 342 for communicatively coupling the common equipment 332, the line modules 334, and the switch modules 336 to one another. For example, the interface 342 can be a backplane, midplane, a bus, optical or electrical connectors, or the like. In the case where the common equipment 332 and the modules 334, 336 are separate devices, e.g., pizza boxes, the interface 342 can be cabling or the like.

The line modules 334 are configured to provide ingress and egress to the switch modules 336 and to external connections on the links to/from the network element 300. In an embodiment, the line modules 334 can form ingress and egress switches with the switch modules 336 as center stage switches for a three-stage switch, e.g., a three-stage Clos switch. Other configurations and/or architectures are also contemplated. The line modules 334 can include optical transceivers, such as, for example, 100G+ Flexible Ethernet (FlexE), Flexible OTN (FlexO), etc. Further, the line modules 334 can include a plurality of optical connections per module and each module may include flexible rate support for any type of connection, such as, for example, 100 Gb/s, 400 Gb/s. N×1.25 Gb/s, N×100 Gb/s, and any rate in between as well as future higher rates. The line modules 334 can include wavelength division multiplexing interfaces, short reach interfaces, and the like, and can connect to other line modules 334 on remote network elements, end clients, edge routers, and the like, e.g., forming connections on the links in a network. From a logical perspective, the line modules 334 provide ingress and egress ports to the network element 300, and each line module 334 can include one or more physical ports. The switch modules 336 are configured to switch channels, timeslots, tributary units, packets, etc. between the line modules 334. For example, the switch modules 336 can provide OTN granularity; SONET/SDH granularity; Ethernet granularity; and the like. Specifically, the switch modules 336 can include Time Division Multiplexed (TDM) (i.e., circuit switching) and/or packet switching engines. The switch modules 336 can include redundancy as well, such as 1:1, 1:N, etc.

Those of ordinary skill in the art will recognize the network element 300 can include other components which are omitted for illustration purposes, and that the systems and methods described herein are contemplated for use with a plurality of different network elements with the network element 300 presented as an example type of network element. For example, in another embodiment, the network element 300 may not include the switch modules 336, but rather have the corresponding functionality in the line modules 334 (or some equivalent) in a distributed fashion. For the network element 300, other architectures providing ingress, egress, and switching are also contemplated for the systems and methods described herein. In general, the systems and methods described herein contemplate use with any network element providing switching and/or transport of channels, timeslots, tributary units, wavelengths, etc.

The network element 300 and the associated modules 334, 336 can support the functions listed in FIGS. 1-6 for the systems 10, 10A, 10B, 10C, 10D, 10E such as the PMA layer 20, the PCS layer 22, the MAC layer 24, the higher layers 26, the reference clock 28, the timestamping module 30, and the time base 32. That is, the modules 334, 336 can host any of the optical modules 12, 12A, 12B, 12C, 12D, 12E. In operation, two network elements 300 can use a time synchronization protocol such as IEEE 1588 PTP to synchronize their time bases 32 with one another. The systems and methods enable any delay asymmetry due to the optical modules 12, 12A, 12B, 12C, 12D, 12E to be addressed thereby providing a more accurate approach considering the advanced functionality in the optical modules 12, 12A, 12B, 12C, 12D, 12E.

The optical modules 12, 12A, 12B, 12C, 12D, 12E can be either pluggable optical modules such as CFP and variants thereof (e.g., CFP, CFP2, CFP4, CFP8, etc.), QSFP and variants thereof (QSFP, QSFP28, QSFP-DD), OSFP, etc. or optical boards/modules which are incorporated in the line modules 134 such as COBO modules. Of course, the optical modules 12, 12A, 12B, 12C, 12D, 12E could also be proprietary vendor implementations.

In the optical modules 12C, 12D, 12E, the various components are a combination of electrical circuitry and/or optical components. The PMA layer 42 is an electrical interface to the PMA layer 20 in the systems 10C, 10D, 10E. The PMD layer 18 and the coherent modem 40 interface between electrical signals and optical signals and connect to the medium 14 which can be an optical fiber. The various other components in the optical modules 12C, 12D, 12E such as the RS FEC layer 44, the SD FEC layer 46, the PMA layer 48, the PCS layer 50, the mapper 52, the framer 54, the MAC layers 60, 62, the PCS layer 64, etc. are implemented via circuitry to perform various functions as is known in the art.

FIG. 8 is a process 400 for timing synchronization and deskewing across optical modules. The process 400 includes providing a plurality of an Optical Tributary Signal (OTSi) members each from one of a plurality of optical devices (step 402); managing the OTSi members as an Optical Tributary Signal Group (OTSiG) (step 404); communicating Precision Time Protocol (PTP) messages between the plurality of optical devices for timing synchronization (step 406); and deskewing the OTSi members based on relative skew and the timing synchronization (step 408). In an embodiment, the line modules 334 can support OTSi members and common time synchronization for deskewing.

In an embodiment, an optical system 100, 110, 112, 120, 122 supporting timing synchronization and deskewing across optical modules includes a plurality of optical devices 102, 140, 142, 170, 172 each providing an Optical Tributary Signal (OTSi) which are part of an Optical Tributary Signal Group (OTSiG) 104, 114, 124; and a communication mechanism 132, 160, 190 between the plurality of optical devices, wherein each of the plurality of optical devices are timing synchronized using the communication mechanism 132, 160, 190 and Precision Time Protocol (PTP) messaging.

Each of the plurality of optical devices 102, 140, 142, 170, 172 can include delay circuitry 230 configured to deskew an associated OTSi with other OTSi signals in the OTSiG 104, 114, 124. Each of the plurality of optical devices 102, 140, 142, 170, 172 can include a time base 242 which is synchronized between each of the plurality of optical devices 102, 140, 142, 170, 172. The optical system of claim 3, wherein each of the plurality of optical devices 102, 140, 142, 170, 172 can be configured to measure relative skew of its OTSi using the time base 242. The relative skew can be measured for a Flexible Ethernet (FlexE) signal based on a shim multiframe and for a Flexible Optical (FlexO) signal based on an Optical Transport Unit C (OTUC) Multiframe Alignment Signal (MFAS).

The communication mechanism 132, 160, 190 includes Ethernet. The communication mechanism 132, 160, 190 is one of a standards-based interface based on a Multi Source Agreement (MSA), a backplane interface, and an external interface connected via cables. The plurality of optical devices 102, 140, 142, 170, 172 can include pluggable optical modules compliant to a Multi Source Agreement (MSA). The plurality of optical devices 102, 140, 142, 170, 172 can include standardized on-board optics. The plurality of optical devices 102, 140, 142, 170, 172 can include independent hardware modules.

The plurality of optical devices 102, 140, 142, 170, 172 can include a host board 206, 208 and an optical modem 216, 218. The host board 206, 208 can include an Ethernet switch 260 which is part of the management communication mechanism and connected to other Ethernet switches on other host boards. The host board 206, 208 can include an IEEE 1588 clock 250 which is configured to perform the Precision Time Protocol (PTP) messaging for synchronization. The optical modem 216, 218 can include an IEEE 1588 clock 250 which is configured to perform the Precision Time Protocol (PTP) messaging for synchronization. The optical modem 216, 218 can include delay measurement and control circuitry 240 which is configured to measure delay and to deskew signals.

In another embodiment, an optical modem 216, 218 supporting an Optical Tributary Signal (OTSi) which is part of an Optical Tributary Signal Group (OTSiG) includes a coherent modem 220; circuitry 222, 224, 226, 228, 230 configured to perform a plurality of Forward Error Correction (FEC), framing, and mapping; a time base 242 which is synchronized with other optical modems in the OTSiG using a communication mechanism and Precision Time Protocol (PTP) messaging; and delay measurement and control circuitry 240 configured to measure delay, determine a relative skew, and deskew based on the time base. The optical modem 216, 218 can be a pluggable optical module compliant to a Multi Source Agreement (MSA) or Optical Internetworking Forum (OIF) Digital Coherent Optics (DCO). The optical modem 216, 218 can be a standardized on-board optics module. The optical modem 216, 218 can be disposed in an independent hardware module.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical module adapted for use in an optical system, the optical module comprising:
an electrical interface with the optical system;
circuitry connected to the electrical interface and configured to implement a plurality of functions;
an optical interface connected to the circuitry; and
timing circuitry located inside the optical module, connected to the electrical interface and the circuitry associated with a multiple of the plurality of functions, and configured to determine timestamps from the multiple of the plurality of functions inside the optical module, wherein the timing circuitry is configured to implement the Precision Time Protocol (PTP) clock functionality with the optical system, based on the timestamps determined from the multiple of the plurality of functions, for one or more of mitigation of delay asymmetry within the optical module and establishment of a common time base for alignment with one or more additional optical modules.

2. The optical module of claim 1, wherein the plurality of functions include management and a data path and the plurality of functions introduce delay asymmetry in the optical module between a forward direction and a reverse direction and the timing circuitry is used to mitigate the delay asymmetry.

3. The optical module of claim 1, wherein the plurality of functions including any of Soft Decision Forward Error Correction, mapping functionality, and coherent modulation.

4. The optical module of claim 3, wherein the PTP clock functionality is a Transparent Clock in the optical module.

5. The optical module of claim 4, wherein the timestamps are determined from two points in the plurality of functions and the timing circuitry determines a residence time in the optical module which is provided to the optical system.

6. The optical module of claim 5, wherein the residence time is provided to the optical system via one of a field in a PTP message or a follow-up PTP message, each sent over the electrical interface.

7. The optical module of claim 3, wherein the PTP dock functionality is a timestamping function for use in a Boundary Clock implementation.

8. The optical module of claim 7, wherein a signal through the optical module is compliant to Optical Transport Network (OTN) and the timestamping function operates based on OTN.

9. The optical module of claim 7, wherein the optical module utilizes an Ethernet extension scheme where Alignment Markers are used on a coherent line, wherein the timestamping function utilizes reserved bits in the Alignment Markers for timestamp references, and wherein PTP messages for the timestamping function are provided over one of an Ethernet data path or the reserved bits.

10. The optical module of claim 1, wherein the optical module is a pluggable optical module compliant to an associated Multi Source Agreement.

11. The optical module of claim 1, wherein the optical module is an on-board optics module.

12. The optical module of claim 1, wherein the optical module is configured to
provide an Optical Tributary Signal (OTSi) which is part of an Optical Tributary Signal Group (OTSiG),
communicate with one or more optical modules associated with the OTSiG, and
synchronize with the one or more optical modules based on PTP messaging.

13. The optical module of claim 12, wherein the optical module further comprises delay circuitry configured to deskew the OTSi with respect to other OTSi signals in the OTSiG.

14. An optical system comprising:
interfaces configured to connect to a plurality of optical modules, wherein each of the plurality of optical modules includes timing circuitry and circuitry associated with a plurality of functions implemented therein, and wherein the timing circuitry is connected to the circuitry of a multiple of the plurality of functions; and
circuitry connected to the interfaces, wherein the circuitry is configured to
implement Precision Time Protocol (PTP) dock functionality with each of the plurality of optical modules via the corresponding timing circuitry located therein for one or more of mitigation of delay asymmetry within the optical module and establishment of a common time base for alignment between the plurality of optical modules based on timestamps determined from the multiple of the plurality of functions inside each optical module.

15. The optical system of claim 14, wherein the plurality of functions include management and a data path and the plurality of functions introduce delay asymmetry in a corresponding optical module between a forward direction and a reverse direction and the timing circuitry is used to mitigate the delay asymmetry.

16. The optical system of claim 14, wherein each of the plurality of optical modules is configured to
provide an Optical Tributary Signal (OTSi) which is part of an Optical Tributary Signal Group (OTSiG),
communicate with other optical modules associated with the OTSiG, and
synchronize with the other optical modules based on PTP messaging.

* * * * *